United States Patent [19]
Yamamuro

[11] Patent Number: 5,793,722
[45] Date of Patent: Aug. 11, 1998

[54] OPTICAL DISK APPARATUS, TRACKING CONTROL CIRCUIT THEREFOR, AND METHOD OF TRACKING GROVES AND LANDS

[75] Inventor: Mikio Yamamuro, Yokohama, Japan

[73] Assignee: Kabushiki Kaisha Toshiba, Kawasaki, Japan

[21] Appl. No.: 694,823

[22] Filed: Aug. 9, 1996

[30] Foreign Application Priority Data

Aug. 10, 1995 [JP] Japan .................................. 7-204429

[51] Int. Cl.$^6$ .................................................. G11B 7/095
[52] U.S. Cl. ................................... 369/44.28; 369/44.29
[58] Field of Search ............................. 369/44.25, 44.26, 369/44.28, 44.29, 44.35, 54, 58

[56] References Cited

U.S. PATENT DOCUMENTS

| | | |
|---|---|---|
| 4,974,220 | 11/1990 | Harada . |
| 5,166,915 | 11/1992 | Fuldner et al. . |
| 5,199,022 | 3/1993 | Suzuki et al. . |
| 5,444,682 | 8/1995 | Yamada et al. ............... 369/44.28 X |
| 5,615,185 | 3/1997 | Horikiri ........................ 369/44.29 X |

FOREIGN PATENT DOCUMENTS 525775  2/1993  European Pat. Off. .

OTHER PUBLICATIONS

Patent Abstract of Japan, vol. 009, No. 024 (P-331) Jan. 1985 re JP-A 59168939.
Patent Abstract of Japan, vol. 012, No. 290 (P-742) Aug. 1988 re JP-A 63066734.
Patent Abstract of Japan, vol. 006, No. 125 (P-127) Jul. 1982 re JP-A 57050330.

*Primary Examiner*—W. R. Young
*Attorney, Agent, or Firm*—Cushman Darby & Cushman IP Group of Pillsbury Madison & Sutro LLP

[57] ABSTRACT

In this invention, when a command indicating movement to a land or groove is output while a beam condensed by an objective lens tracks a groove or land, the polarity is inverted, and a jump pulse is generated. Tracking servo control is stopped during generation of the jump pulse, thereby changing the tracking position from the groove or land to the land or groove. With this operation, the tracking position can be accurately changed from the groove or land to the land or groove for an optical disk having concentric or spiral grooves and lands as recording tracks. Also in this invention, when a switching position is detected while the beam condensed by the objective lens tracks the groove or land, the polarity is inverted. At the same time, tracking servo control is stopped to change the tracking position from the groove or land to the land or groove. With this operation, the tracking position can be accurately changed from the groove or land to the land or groove in an optical disk in which lands and grooves are alternately formed in units of rounds and linked together.

13 Claims, 13 Drawing Sheets

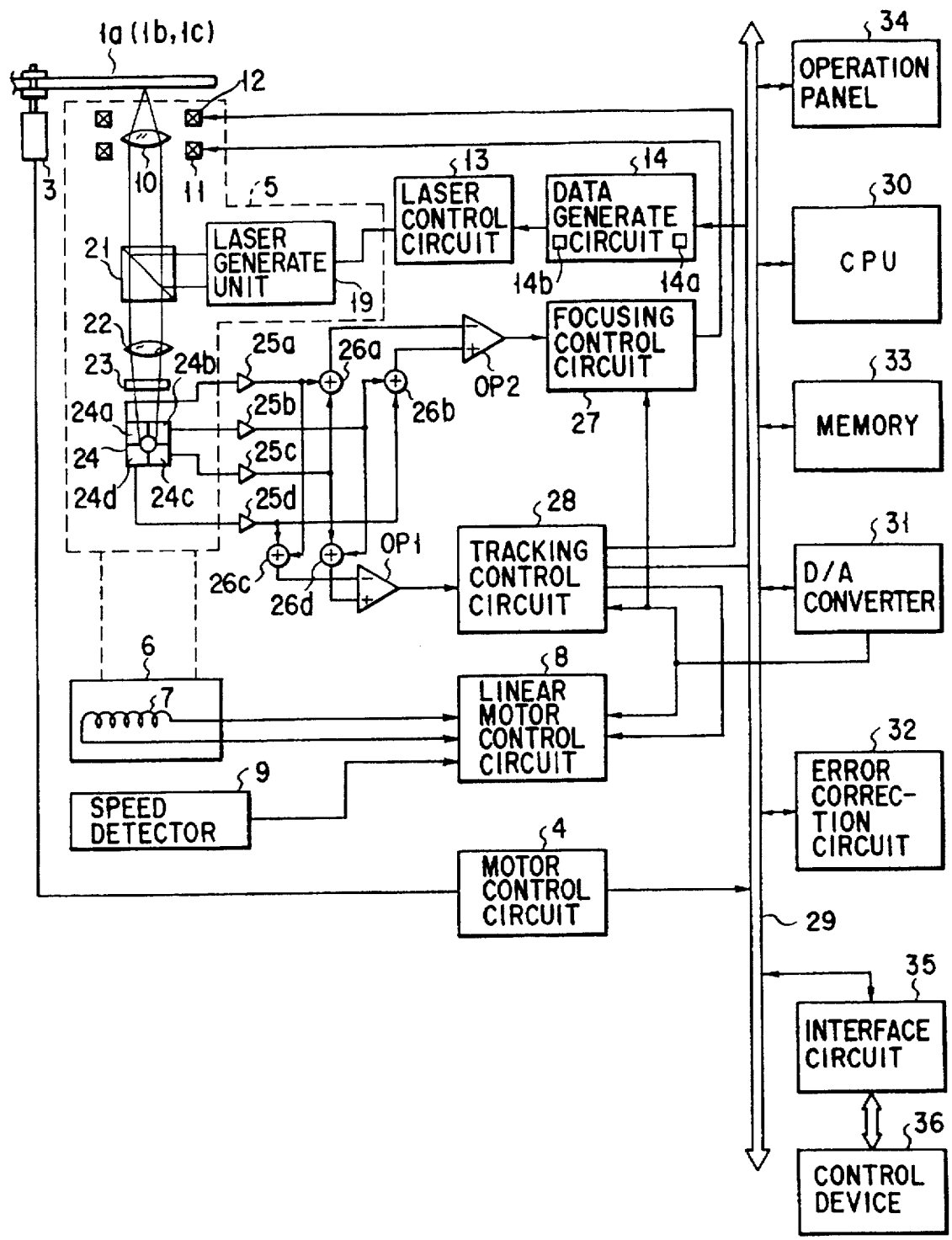
F I G. 1

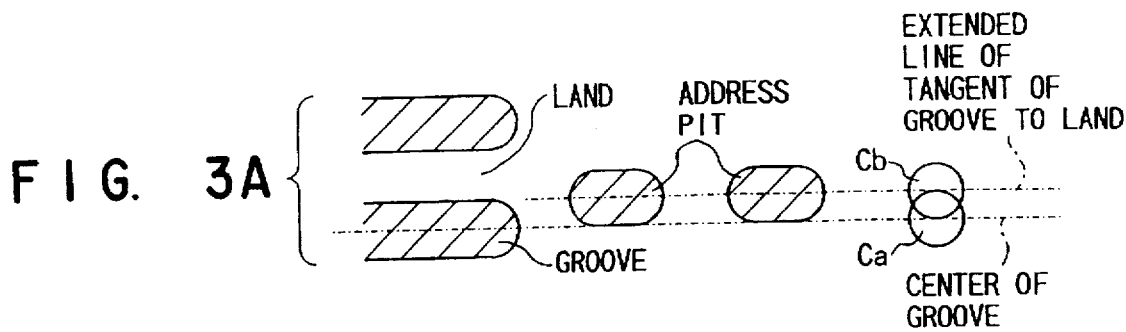
FIG. 3A
FIG. 3B
FIG. 3C
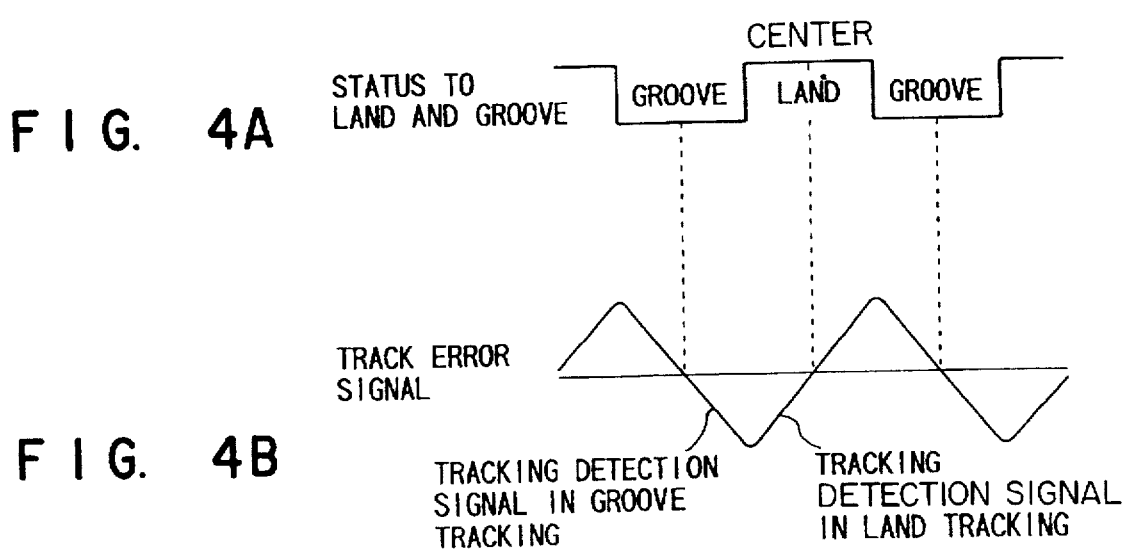
FIG. 4A
FIG. 4B

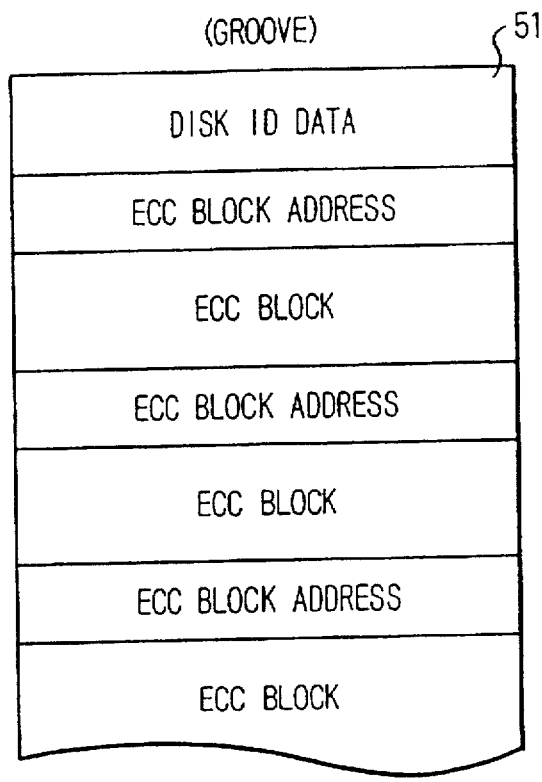
F I G. 8
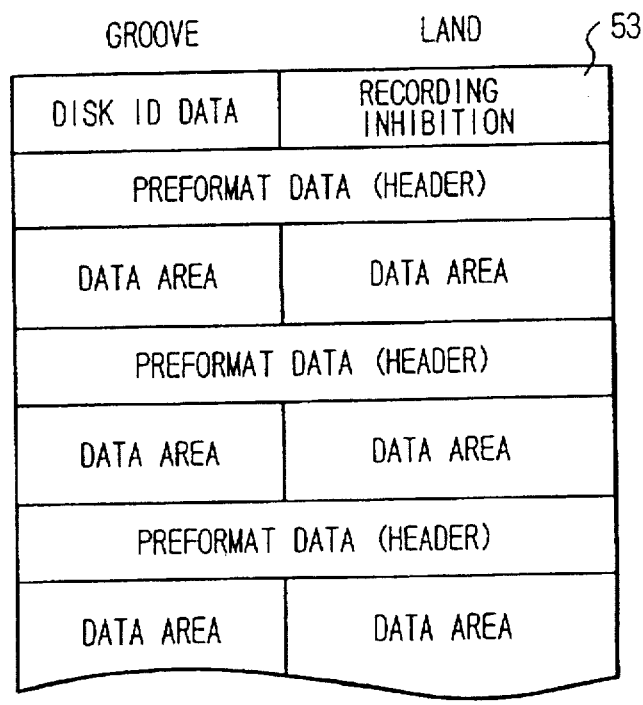
F I G. 10

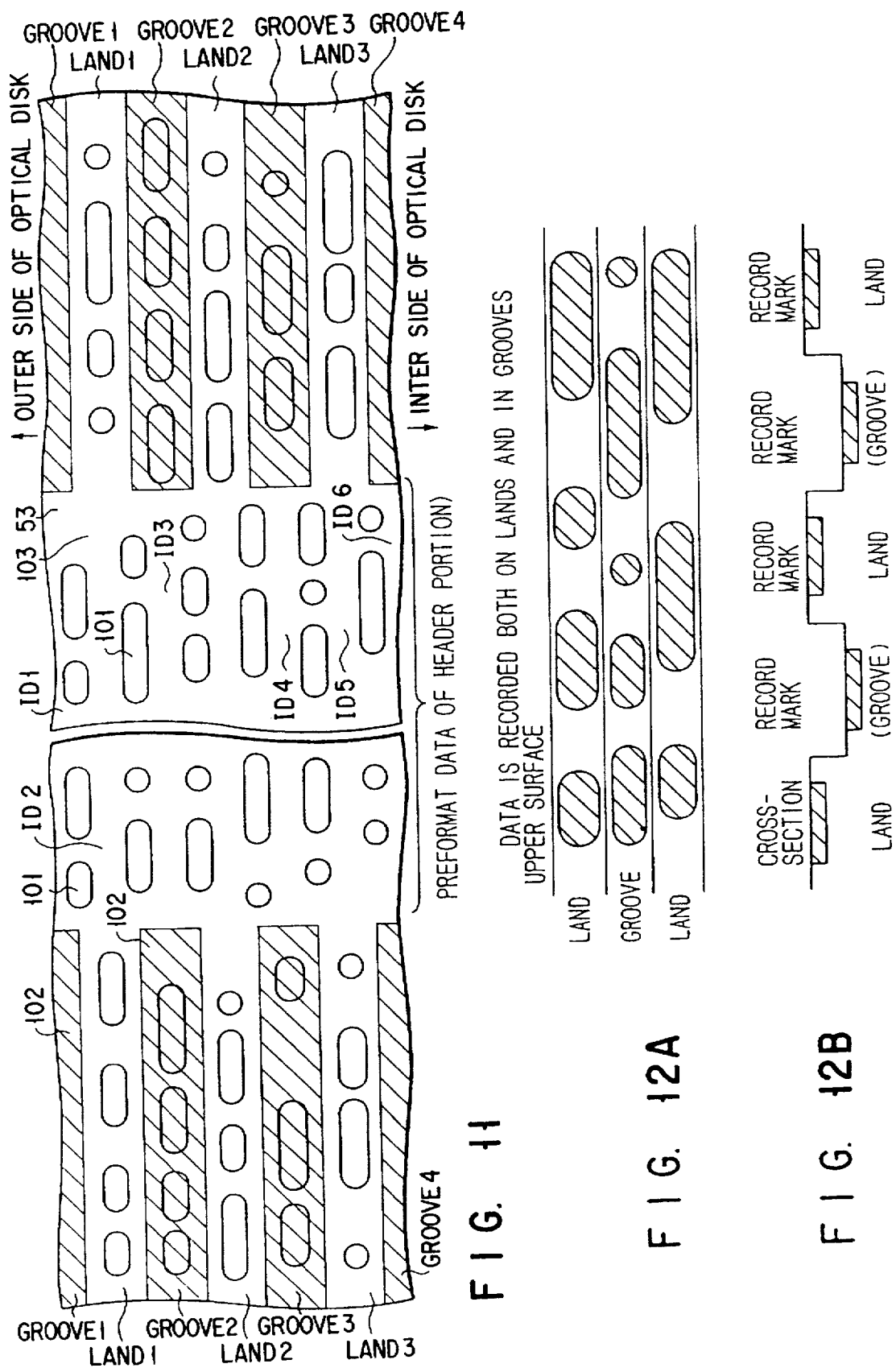

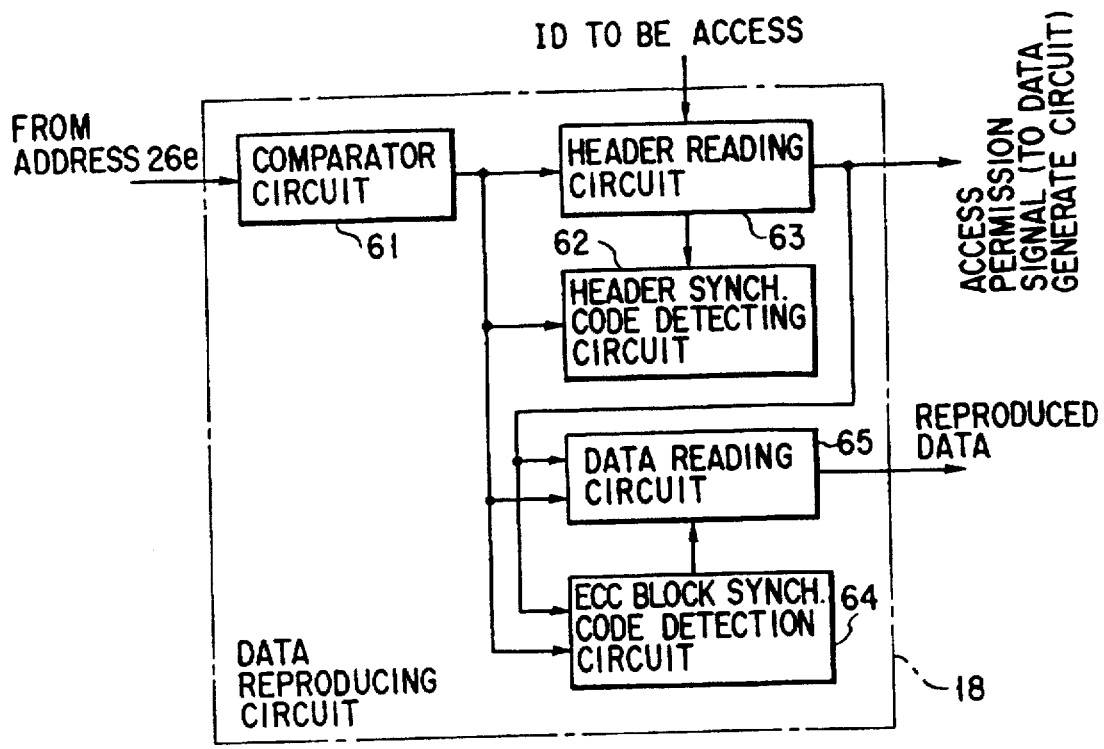
F I G. 14
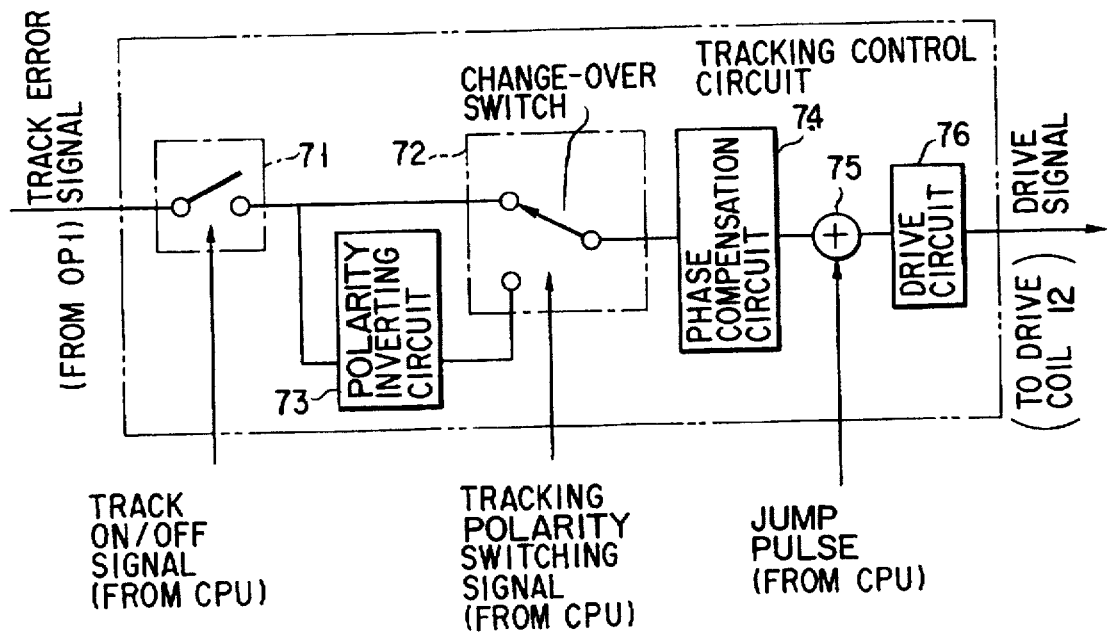
F I G. 15

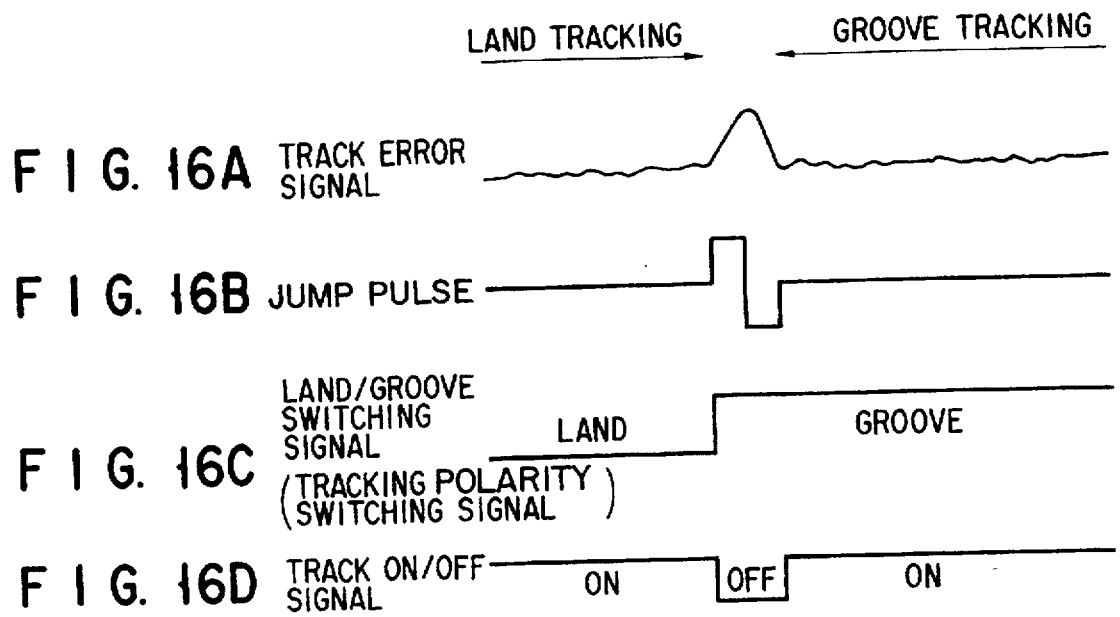
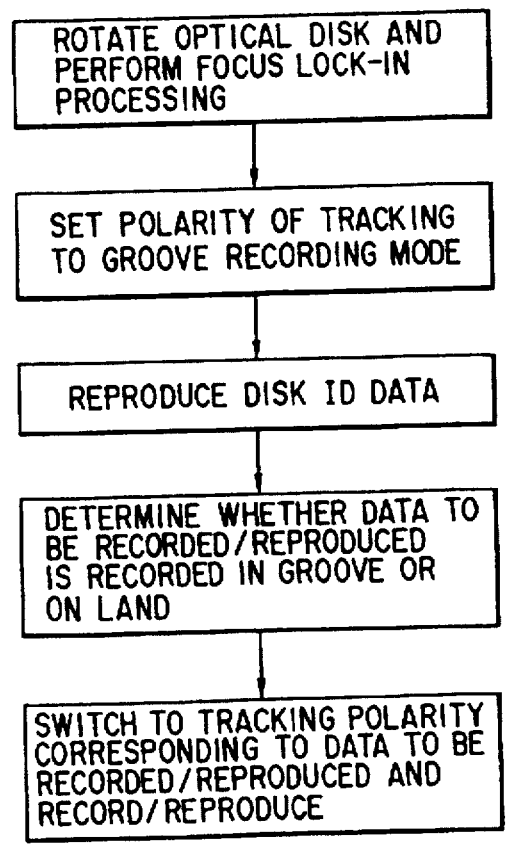

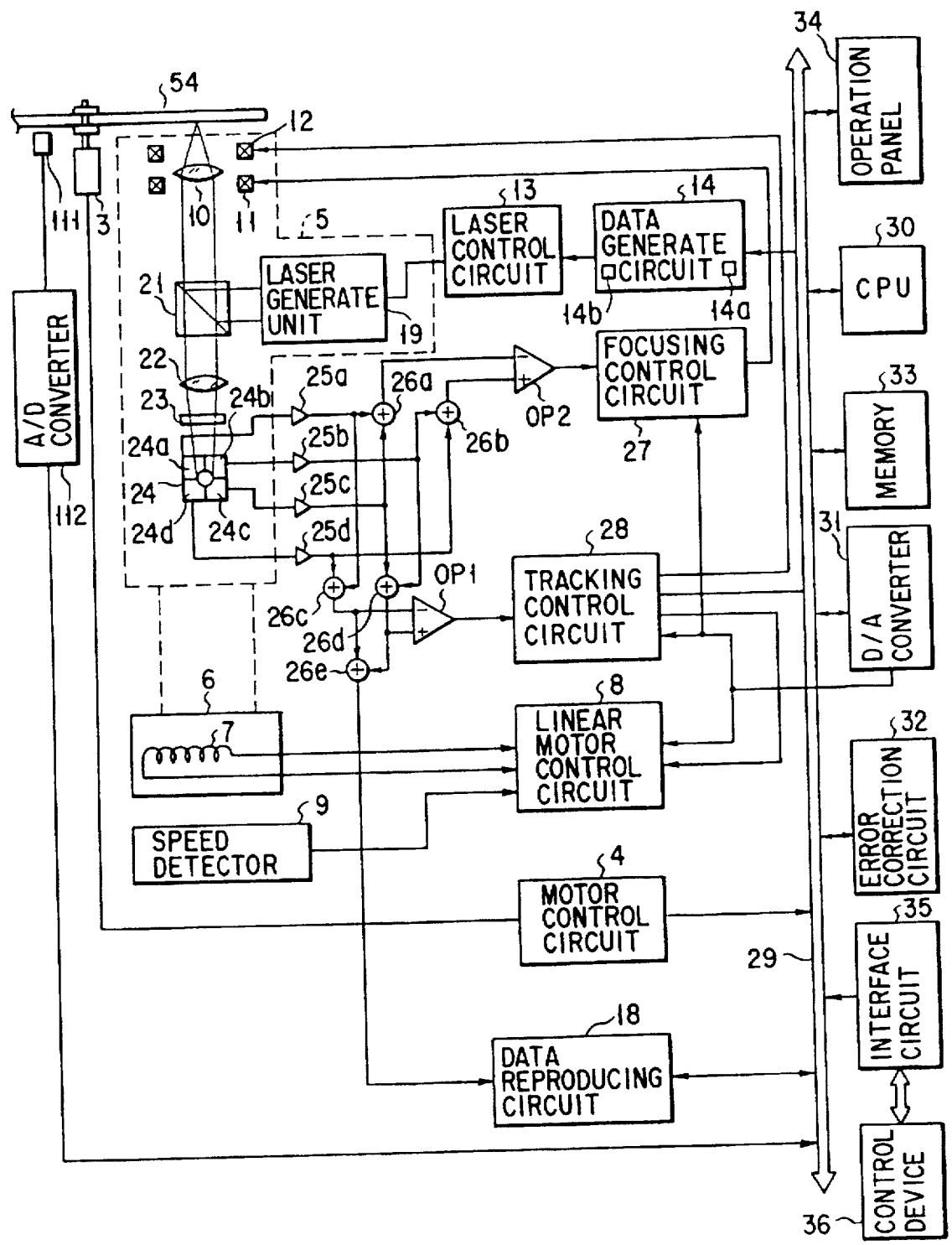
F I G. 20

OPTICAL DISK APPARATUS, TRACKING CONTROL CIRCUIT THEREFOR, AND METHOD OF TRACKING GROVES AND LANDS

BACKGROUND OF THE INVENTION

1. Field of the Invention

The present invention relates to an optical disk apparatus for recording data in/on a concentric or spiral groove and a land as the recording tracks of an optical disk, and reproducing the recorded data, a tracking control circuit therefor, and a method of changing a tracking position.

2. Description of the Related Art

Conventional optical disks include an optical disk on which data is recorded in or reproduction from only a guide groove (groove) and an optical disk (CD-ROM) on which data is recorded by forming record marks representing data in a virtual guide groove in advance in an optical disk mastering process. Tracking is performed for such an optical disk by using a track error signal (tracking detection output) obtained from a guide groove (groove) or a record mark. In this operation, the tracking polarity is set to one direction (positive phase), and data is recorded or reproduced.

Recently, another optical disk has been proposed (Jpn. Pat. Appln. KOKOKU Publication No. 63-57895). In this optical disk, data is recorded in or reproduced from both guide grooves (grooves) and on flat portions (lands) between the guide grooves.

In such an optical disk, the polarity of a track error signal (the polarity of a tracking detection output) used to perform tracking must be inverted in accordance with tracking for guide grooves (grooves) or tracking for flat portions (lands). In tracking the grooves, the polarity of the tracking detection output is set to a positive phase. In tracking the lands, the polarity of the tracking detection output is set to an opposite or negative phase.

In the above disk, the tracking position is changed from a groove to a land by simply switching the polarity of the tracking detection output from the positive phase to the opposite phase, whereas the tracking position is changed from the land to the groove by switching the opposite phase to the positive phase. However, it cannot be determined and specified whether the tracking position is moved in the outer or inner circumferential direction of the optical disk.

The tracking position cannot therefore be accurately changed from the groove or land to the land or groove.

In addition, conventional optical disks do not include an optical disk in which lands and grooves are alternately present in units of rounds, and data are recorded/reproduced in units of rounds in a land-groove-land order.

In this case, an optical disk is not invented in which a land or groove is switched to a groove or land for each round.

SUMMARY OF THE INVENTION

It is an object of the present invention to accurately change the tracking position from a groove or land to a land or groove for an optical disk on/from which data is recorded/reproduced by using both the groove and the land.

It is another object of the present invention to accurately perform tracking control in an optical disk in which grooves and lands are alternately present in units of rounds and a land or groove is switched to a groove or land for each round, and on/from which data is recorded/reproduced.

To achieve the above object, the present invention provides an optical disk apparatus for recording data on a concentric or spiral groove and a land as recording tracks of an optical disk, and reproducing the recorded data comprising: condensing means for condensing a beam on the groove or land on the optical disk; detecting means for detecting the beam from the optical disk; moving means for moving the condensing means in a direction perpendicular to an optical axis; signal generating means for generating a track error signal for the track of the optical disk on the basis of a detection signal from the detecting means; polarity inverting means for inverting a polarity of the track error signal generated by the signal generating means; control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity inverting means upon reception of a command indicating land tracking, thereby causing the beam condensed by the condensing means to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides a tracking control circuit comprising: condensing means for condensing a beam on a concentric or spiral groove or land as a recording track of an optical disk; detecting means for detecting the beam from the optical disk; moving means for moving the condensing means in a direction perpendicular to an optical axis; signal generating means for generating a track error signal for the track of the optical disk on the basis of a detection signal from the detecting means; polarity inverting means for inverting a polarity of the track error signal generated by the signal generating means; control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity inverting means upon reception of a command indicating land tracking, thereby causing the beam condensed by the condensing means to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides an optical disk apparatus for recording data on a concentric or spiral groove and a land as recording tracks of an optical disk, and reproducing the recorded data comprising: condensing means for condensing a beam on the groove or land on the optical disk; detecting means for detecting the beam from the optical disk; moving means for moving the condensing means in a direction perpendicular to an optical axis; signal generating means for generating a track error signal for the track of the optical disk on the basis of a detection signal from the detecting means; polarity determining means for inverting a polarity of the track error signal generated by the signal generating means; control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity determining means upon reception of a command indicating land tracking, thereby causing the beam condensed by the condensing means to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting means for inhibiting tracking control of the control means while the generating means generates the jump pulse; and changing means for causing the control means, to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides a tracking control circuit comprising: condensing means for condensing a beam on a concentric or spiral groove or land as a recording track of an optical disk; detecting means for detecting the beam from the optical disk; moving means for moving the condensing means in a direction perpendicular to an optical axis; signal generating means for generating a track error signal for the track of the optical disk on the basis of a detection signal from the detecting means; polarity determining means for inverting a polarity of the track error signal generated by the signal generating means; control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity determining means upon reception of a command indicating land tracking, thereby causing the beam condensed by the condensing means to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting means for inhibiting tracking control of the control means while the generating means generates the jump pulse; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides an optical disk apparatus for recording data on a concentric or spiral groove and a land as recording tracks of an optical disk, and reproducing the recorded data comprising: condensing means for condensing a beam on the groove or land on the optical disk; detecting means for detecting the beam from the optical disk; moving means for moving the condensing means in a direction perpendicular to an optical axis; signal generating means for generating a track error signal for the track of the optical disk on the basis of a detection signal from the detecting means; polarity determining means for inverting a polarity of the track error signal generated by the signal generating means; first control means for moving and controlling the condensing means by the moving means in accordance with the track error signal generated by the signal generating means upon reception of a command indicating groove tracking, thereby causing the beam condensed by the condensing means to track the groove; second control means for moving and controlling the condensing means by the moving means in accordance with the track error signal having the polarity inverted by the polarity determining means upon reception of a command indicating land tracking, thereby causing the beam condensed by the condensing means to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting means for inhibiting tracking control of the first and second control means while the generating means generates the jump pulse; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides a tracking control circuit comprising: condensing means for condensing a beam on a concentric or spiral groove or land as a recording track of an optical disk; detecting means for detecting the beam from the optical disk; moving means for moving the condensing means in a direction perpendicular to an optical axis; signal generating means for generating a track error signal for the track of the optical disk on the basis of a detection signal from the detecting means; polarity determining means for inverting a polarity of the track error signal generated by the signal generating means; first control means for moving and controlling the condensing means by the moving means in accordance with the track error signal generated by the signal generating means upon reception of a command indicating groove tracking, thereby causing the beam condensed by the condensing means to track the groove; second control means for moving and controlling the condensing means by the moving means in accordance with the track error signal having the polarity inverted by the polarity determining means upon reception of a command indicating land tracking, thereby causing the beam condensed by the condensing means to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting means for inhibiting tracking control of the first and second control means while the generating means generates the jump pulse; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides a method of changing a tracking position in an optical disk apparatus for recording data on a concentric or spiral groove and a land as recording tracks of an optical disk, and reproducing the recorded data comprising: condensing a beam on the groove or land on the optical disk; detecting a beam, of the beam condensed on the groove or land, from the optical disk; generating a track error signal for the track of the optical disk on the basis of a detection signal; moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides a method of moving a tracking control circuit comprising: condensing a beam on a concentric or spiral groove or land as a recording track of an optical disk; detecting a beam, of the beam condensed on the groove or land, from the optical disk; generating a track error signal for the track of the optical disk on the basis of a detection signal; moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides a method of changing position in an optical disk apparatus for recording data on a concentric or spiral groove and a land as recording tracks of an optical disk, and reproducing the recorded data comprising: condensing a beam on the groove or land on the optical disk; detecting a beam, of the beam condensed on the groove or land, from the optical disk; generating a track error signal for the track of the optical disk on the basis of a detection signal; moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting tracking control during generation of the jump pulse; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides a method of moving a tracking control circuit comprising: condensing a beam on a concentric or spiral groove or land as a recording track of an optical disk; detecting a beam, of the beam condensed on the groove or land, from the optical disk; generating a track error signal for the track of the optical disk on the basis of a detection signal; moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land; generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting tracking control during generation of the jump pulse; and changing means for causing the control means to stop tracking while the generating means is generating the jump pulse, causing the moving means to move the condensing means, in accordance with the jump pulse, and inverting the polarity by the polarity inverting means to start the tracking upon completion of movement of the beam, thereby changing a tracking position from the groove to the land, or from the land to the groove.

The present invention also provides an apparatus for an optical disk for recording data on both a spiral groove and a land of the optical disk in which grooves and lands are alternately formed as recording tracks in units of rounds, and reproducing the recorded data comprising: condensing means for condensing a beam on the groove or land on the optical disk; first detecting means for detecting the beam from the optical disk; moving means for moving the condensing means in a direction perpendicular to an optical axis; signal generating means for generating a track error signal for the track of the optical disk on the basis of a detection signal from the first detecting means; polarity determining means for inverting a polarity of the track error signal generated by the signal generating means; control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity determining means upon reception of a command indicating land tracking, thereby causing the beam condensed by the condensing means to track the land; second detecting means for detecting a tracking shift of the beam from the land to the groove while the beam condensed by the condensing means is tracking the land, or from the groove to the land while the beam condensed by the condensing means is tracking the groove; and changing means for causing the control means to stop tracking in accordance with detection of the second detecting means, inverting the polarity by the polarity determining means, and then starting the tracking of the beam, thereby changing the tracking from the groove to the land, or from the land to the groove.

The present invention also provides a tracking control circuit comprising: condensing means for condensing a beam on a spiral groove or land of an optical disk in which grooves and lands are alternately formed as recording tracks in units of rounds; first detecting means for detecting the beam from the optical disk; moving means for moving the condensing means in a direction perpendicular to an optical axis; signal generating means for generating a track error signal for the track of the optical disk on the basis of a detection signal from the first detecting means; polarity determining means for inverting a polarity of the track error signal generated by the signal generating means; control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity determining means upon reception of a command indicating land tracking, thereby causing the beam condensed by the condensing means to track the land; second detecting means for detecting a tracking shift of the beam from the land to the groove while the beam condensed by the condensing means is tracking the land, or from the groove to the land while the beam condensed by the condensing means is tracking the groove; and changing means for causing the control means to stop tracking in accordance with detection of the second detecting means, inverting the polarity by the polarity determining means, and then starting the tracking of the beam, thereby changing the tracking from the groove to the land, or from the land to the groove.

The present invention also provides a method of changing tracking in an optical disk apparatus for recording data on a spiral groove and a land of an optical disk in which grooves and lands are alternately formed as recording tracks in units of rounds, and reproducing the recorded data comprising: condensing a beam on the groove or land on the optical disk; detecting a beam, of the beam condensed on the groove or land, from the optical disk; generating a track error signal for the track of the optical disk on the basis of a detection signal; moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land; second detecting means for detecting a tracking shift of the beam from the land to the groove while the beam condensed by the condensing means is tracking the land, or from the groove to the land while the beam condensed by the condensing means is tracking the groove; and changing means for causing the control means to stop tracking in accordance with detection of the second detecting means, inverting the polarity by the polarity determining means, and then starting the tracking of the beam, thereby changing the tracking from the groove to the land, or from the land to the groove.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the schematic arrangement of a cutting apparatus to explain an embodiment of the present invention;

FIGS. 3A, 3B, and 3C are views for explaining generation of grooves, generation of address pits, and a modulation signal;

FIGS. 4A and 4B are views for explaining a track error signal in correspondence with a land and a groove;

FIG. 8 is a view showing an example of how data is recorded on a read only optical disk;

FIG. 10 is a view showing an example of how data is recorded on a rewritable optical disk on which data is recorded in grooves and on lands;

FIG. 11 is a view for explaining the preformat data of a header portion;

FIGS. 12A and 12B are views showing an example of how record marks are recorded on a rewritable optical disk on which data is recorded on grooves and lands;

FIG. 14 is a block diagram showing the schematic arrangement of a data reproducing circuit;

FIG. 15 is a block diagram showing the schematic arrangement of a tracking control circuit;

FIGS. 16A, 16B, 16C, and 16D are charts showing the waveforms of signals for main components when land tracking is shifted to groove tracking;

FIG. 17 is a flow chart for explaining an operation;

FIG. 20 is a block diagram showing the schematic arrangement of an optical disk apparatus with a photosensor.

DETAILED DESCRIPTION OF THE PREFERRED EMBODIMENTS

Figure 2:
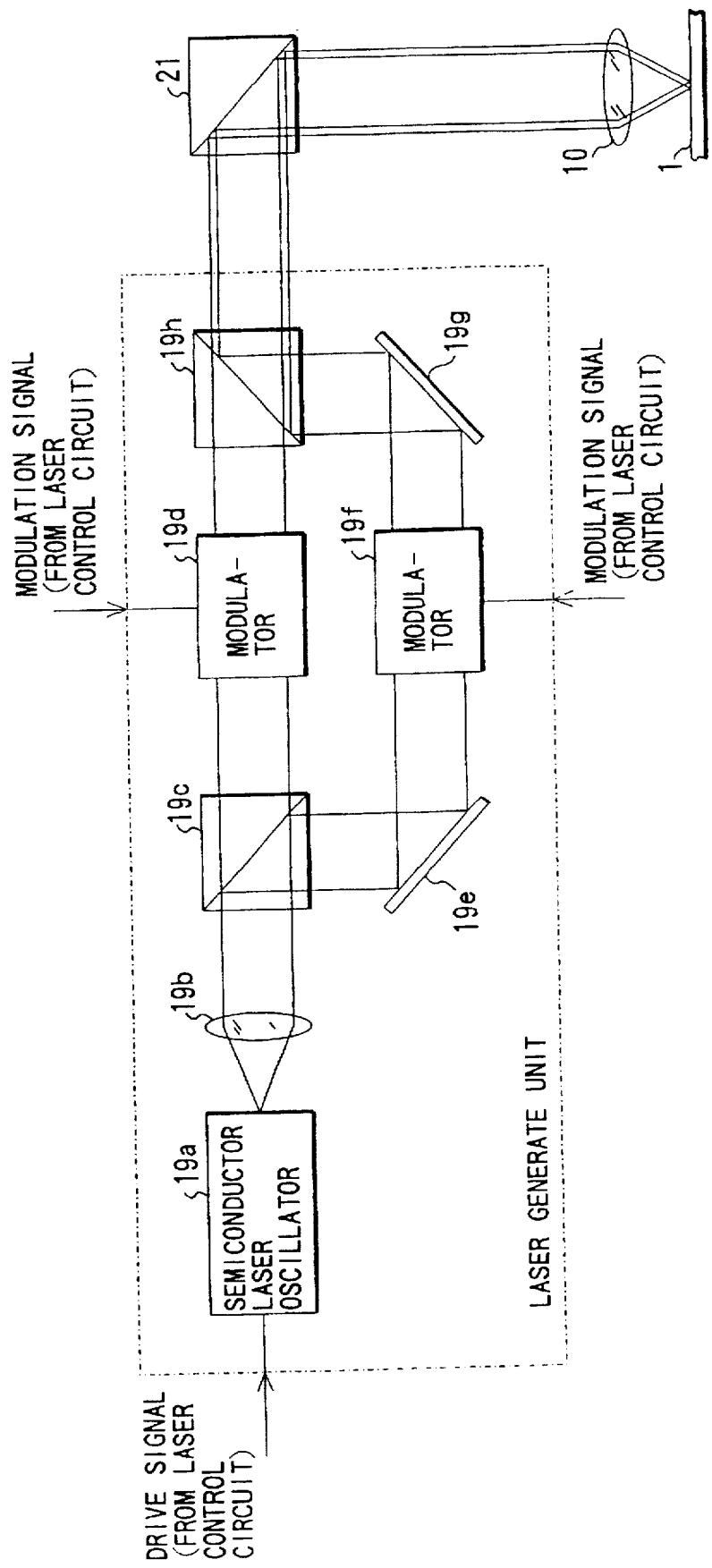
FIG. 2 is a view showing the schematic arrangement of a laser generate unit.

An embodiment of the present invention will be described below with reference to the accompanying drawings.

FIG. 1 shows a cutting apparatus for forming a glass master (mastering process) in forming a stamper. Referring to FIG. 1, in forming a glass master for a read only optical disk (CD-ROM), the cutting apparatus forms minute concave record marks (pits) on a glass substrate 1a having no uneven portions by melting a photoresist on the substrate upon ON/OFF control of laser power.

In forming a glass master for a rewritable optical disk (RAM), the cutting apparatus forms minute concave record marks (pits) on a glass substrate 1b having uneven portions as recording tracks by melting a photoresist on the substrate upon ON/OFF control of laser power in accordance with the concave portions (grooves) of the tracks.

Furthermore, in forming a glass master for a rewritable optical disk (RAM), the cutting apparatus forms minute concave record marks (pits) on a glass substrate 1c having uneven portions as recording tracks by melting a photoresist on the substrate upon ON/OFF control of laser power in accordance with the concave portions (grooves) and convex portions (lands) of the tracks.

Referring to FIG. 1, the glass substrate 1a (1b, 1c) coated with a photoresist is rotated at, e.g., a constant speed by a motor 3. This motor 3 is controlled by a motor control circuit 4.

A cutting process for the glass substrate 1a (1b, 1c) is performed by an optical head 5. The optical head 5 is fixed to a drive coil 7 constituting the movable portion of a linear motor 6. The drive coil 7 is connected to a linear motor control circuit 8.

A speed detector 9 is connected to the linear motor control circuit 8. A speed signal from the speed detector 9 is sent to the linear motor control circuit 8.

A permanent magnet (not shown) is mounted on the stationary portion of the linear motor 6. When the drive coil 7 is excited by the linear motor control circuit 8, the optical head 5 is moved in the radial direction of the glass substrate 1a (1b, 1c).

An objective lens 10 is held on the optical head 5 with a wire or leaf spring (not shown). The objective lens 10 is moved in the focusing direction (along the optical axis of the lens) by a drive coil 11, and is moved in the tracking direction (perpendicular to the optical axis of the lens) by a drive coil 12.

A laser beam emitted from a laser generate unit 19 constituted by a semiconductor laser oscillator (argon neon laser oscillator) driven by a laser control circuit 13 is irradiated on the glass substrate 1a (1b, 1c) via a half prism 21, and the objective lens 10. The light reflected by the glass substrate 1a is guided to a photodetector 24 via the objective lens 10, the half prism 21, a condenser lens 22, and a cylindrical lens 23.

As shown in FIG. 2, the laser generate unit 19 comprises a semiconductor laser oscillator (argon neon laser oscillator) 19a for generating a laser beam, a collimator lens 19b for converting the laser beam emitted from the semiconductor laser oscillator 19a into a parallel beam, a beam splitter 19c for separating the laser beam passing through the collimator lens 19b into a transmitted beam and a reflected beam, a modulator 19d for modulating the laser beam transmitted through the beam splitter 19c, a modulator 19f for modulating the laser beam reflected by the beam splitter 19c and guided thereto via a mirror 19e, and a half prism 19h for transmitting the laser beam from the modulator 19d and reflecting the laser beam guided from the modulator 19f via a mirror 19g.

The modulators 19d and 19f respectively selectively seal guided laser beams in accordance with a control signal sent from the laser control circuit 13. Each modulator is constituted by a shutter or the like. In forming a groove, the modulator 19d transmits a laser beam therethrough by modulating the laser beam in accordance with a modulation signal shown in FIG. 3C. In forming an address pit, the modulator 19f transmits a laser beam therethrough by modulating the laser beam in accordance with a modulation signal shown in FIG. 3B.

A laser beam Ca from the modulator 19d is guided to the glass substrate 1a (1b, 1c) via the half prism 19h, the half prism 21, and the objective lens 10. A laser beam Cb from the modulator 19f is guided to the glass substrate 1a (1b, 1c) via the mirror 19g, the half prism 19h, the half prism 21, and the objective lens 10.

At this time, the center of the laser beam Ca coincides with the center of a groove. The mirror 19g is adjusted to shift the center of the laser beam Cb from the center of the groove in the radial direction of the glass substrate 1a (1b, 1c).

With this operation, the center of the laser beam Ca coincides with the groove center, while the center of the laser beam Cb coincides with the extended line of the tangent of the groove to an adjacent land, as shown in FIG. 3A.

The photodetector 24 is constituted by four divided photodetection cells 24a, 24b, 24c, and 24d.

An output signal from the photodetection cell 24a of the photodetector 24 is supplied to one input terminal of each of adders 26a and 26c via an amplifier 25a. An output signal from the photodetection cell 24b is supplied to one input terminal of each of adders 26b and 26d via an amplifier 25b. An output signal from the photodetection cell 24c is supplied to the other input terminal of each of the adders 26a and 26d via an amplifier 25c. An output signal from the photodetection cell 24d is supplied to the other input terminal of each of the adders 26b and 26c via an amplifier 25d.

An output signal from the adder 26a is supplied to the inverting input terminal of a differential amplifier OP2. An output signal from the adder 26b is supplied to the noninverting input terminal of the differential amplifier OP2. With this operation, the differential amplifier OP2 supplies a signal associated with a focal point to a focusing control circuit 27 in accordance with the difference between the signals from the adders 26a and 26b. An output signal from the focusing control circuit 27 is supplied to the focusing drive coil 12. As a result, the laser beam is controlled to be always set in a just focus state on the glass substrate 1a (1b, 1c).

An output signal from the adder 26d is supplied to the noninverting input terminal of a differential amplifier OP1. An output signal from the adder 26c is supplied to the inverting input terminal of the differential amplifier OP1. With this operation, the differential amplifier OP1 supplies a track error signal to a tracking control circuit 28 in accordance with the difference between the output signals from the adders 26d and 26c. The tracking control circuit 28 forms a track drive signal in accordance with the track error signal supplied from the differential amplifier OP1. Note that a track drive signal for the glass substrate 1a is formed in accordance with a control signal supplied from a CPU 30.

As shown in FIGS. 4A and 4B, a track error signal changes in accordance with a change in position of a laser beam over grooves and lands. More specifically, the track error signal is ⌈0⌋ when the laser beam is located at the center of a groove or land. As the position of the laser beam is away from the center of the groove or land, the signal changes more largely from ⌈0⌋.

The track drive signal output from the tracking control circuit 28 is supplied to the tracking drive coil 12. The track error signal used by the tracking control circuit 28 is supplied to the linear motor control circuit 8.

When the track drive signal is supplied to the drive coil 12, the objective lens 10 gradually moves from one groove (record mark string) to another by a distance corresponding to one track while the glass substrate 1b (1a) rotates once, or the objective lens 10 gradually moves from a groove to a groove or from a land to a land by a distance corresponding to one track while the glass substrate 1c rotates once.

While the objective lens 10 is moved by the tracking control circuit 28, the linear motor control circuit 8 moves the linear motor 6, i.e., the optical head 5, such that the objective lens 10 is located near the central position of the optical head 5.

A data generate circuit 14 is arranged on the input side of the laser control circuit 13. The data generate circuit 14 includes an ECC (error correcting code) block data generate circuit 14a for converting ECC block format data as record data like the one shown in FIG. 6, which is supplied from an error correction circuit 32, into ECC block format data having ECC block synch. codes, as shown in FIG. 5, and a modulation circuit 14b for converting (modulating) the record data from the ECC block data generate circuit 14a according to the 8-16 code conversion scheme or the like.

Figure 5:
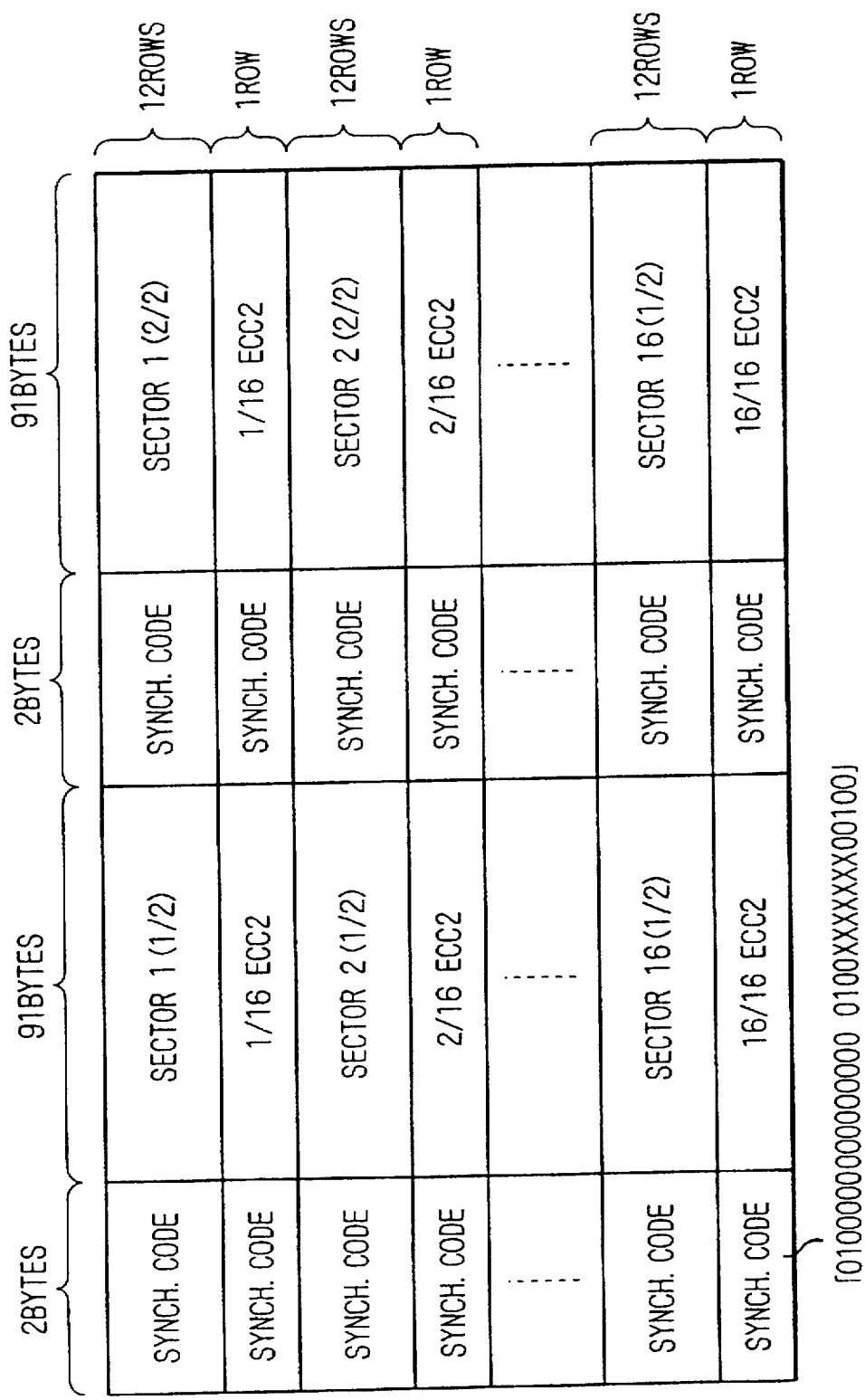
FIG. 5 is a view for explaining ECC block format data to which ECC block synch. codes are added.

As shown in FIG. 5, each ECC block synch. code has a 2-byte configuration, i.e., "0100000000000000 0100xxxxxxx00100" and is obtained by converting "175, 240" into an 8-16 code. This ECC block synch. code is different from a synch. code for ID detection.

The ECC block format data in FIG. 5 represents a format actually recorded on an optical disk. Each sector of the ECC block format data in FIG. 6 has a 182 byte×12 row configuration and consists of record data, a sector ID, and an ECC for the side direction. In contrast to this, in the ECC block format data in FIG. 5, 2-byte synch. codes are added in units of 91 bytes, and a 2-byte synch. code is added to an ECC for the length direction for each 91 byte×12 row unit.

Record data to which error correcting codes (ECCs) are added by the error correction circuit 32 is supplied to the data generate circuit 14. Record data from a control device 36 as an external device is supplied to the error correction circuit 32 via an interface circuit 35 and a bus 29.

Figure 6:
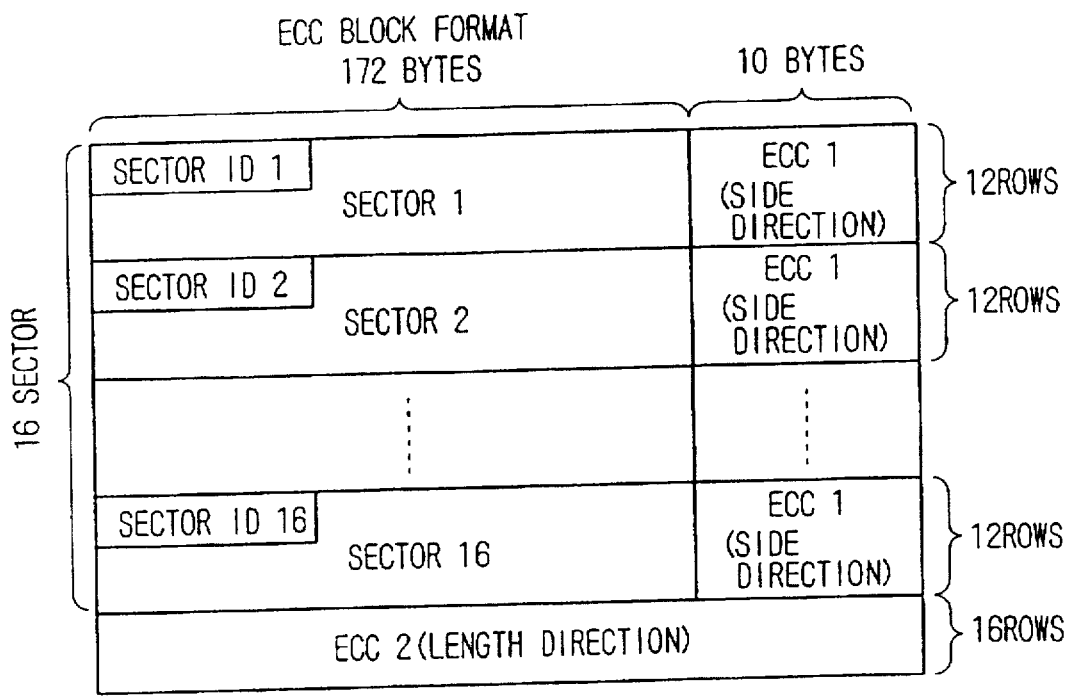
FIG. 6 is a view for explaining ECC block format data.

The error correction circuit 32 adds error correcting codes (ECCs 1 and 2) for the width and length directions and a sector ID to each 4 Kbyte sector of 32 Kbyte record data supplied from the control device 46 to form ECC block format data like the one shown in FIG. 6.

This cutting apparatus has a D/A converter 31 used to exchange data between the focusing control circuit 27, the tracking control circuit 28, the linear motor control circuit 8, and the CPU 30.

The laser control circuit 13, the focusing control circuit 27, the tracking control circuit 28, the linear motor control circuit 8, the motor control circuit 4, the data generate circuit 14, and the like are controlled by the CPU 30 via a bus line 29. The CPU 30 performs predetermined operations in accordance with a cutting start command from an operation panel 34 and programs stored in a memory 33.

After the above cutting apparatus completes a cutting process by melting the photoresist on the glass substrate 1a in accordance with record data for the entire surface of the substrate, developing and conducting processes are performed, thereby forming a glass master. A stamper consisting of nickel or the like is formed by electroplating or the like using this glass master.

A read only optical disk 51 is formed by injection molding or the like using this stamper.

After the cutting apparatus completes a cutting process by melting the photoresist on the glass substrate 1b in accordance with record data for the entire surface of the substrate, developing and conducting processes are performed, thereby forming a glass master. A stamper consisting of nickel or the like is formed by electroplating or the like using this glass master.

A rewritable optical disk (RAM) 52 having data recorded in only its grooves is formed by injection molding or the like using this stamper.

After the cutting apparatus completes a cutting process by melting the photoresist on the glass substrate 1c in accordance with record data for the entire surface of the substrate, developing and conducting processes are performed, thereby forming a glass master. A stamper consisting of nickel or the like is formed by electroplating or the like using this glass master.

A rewritable optical disk (RAM) 53 having data recorded in/on its grooves and lands is formed by injection molding or the like using this stamper.

Figure 7A:
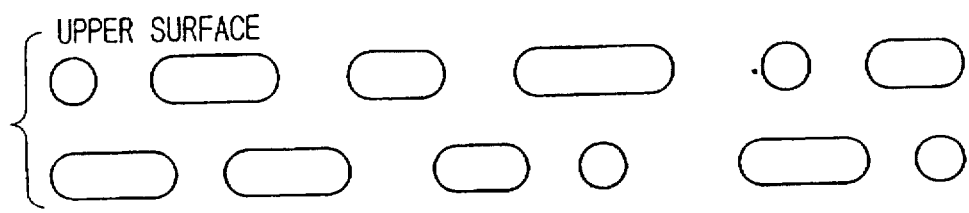
FIGS. 7A and 7B are views showing an example of how record marks (pits) are recorded on a read only optical disk.
Figure 7B:
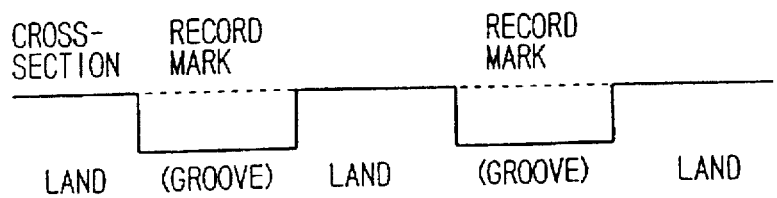

As shown in FIGS. 7A and 7B, minute concave record marks (pits) corresponding to data are formed on the read only optical disk 51. The pit portions as record marks correspond to grooves, and the remaining portions correspond to lands. In the read only optical disk 51, as shown in FIG. 8, data is recorded in the above ECC block data unit (e.g., 38,688 bytes), and disk ID data is recorded as innermost ECC block data. This disk ID data includes data used to determine whether the disk is designed to record data in only grooves or both in grooves and on lands, data used to determine whether addresses on/from which data are to be recorded/reproduced are present on lands or in grooves, and the like.

Figure 9:
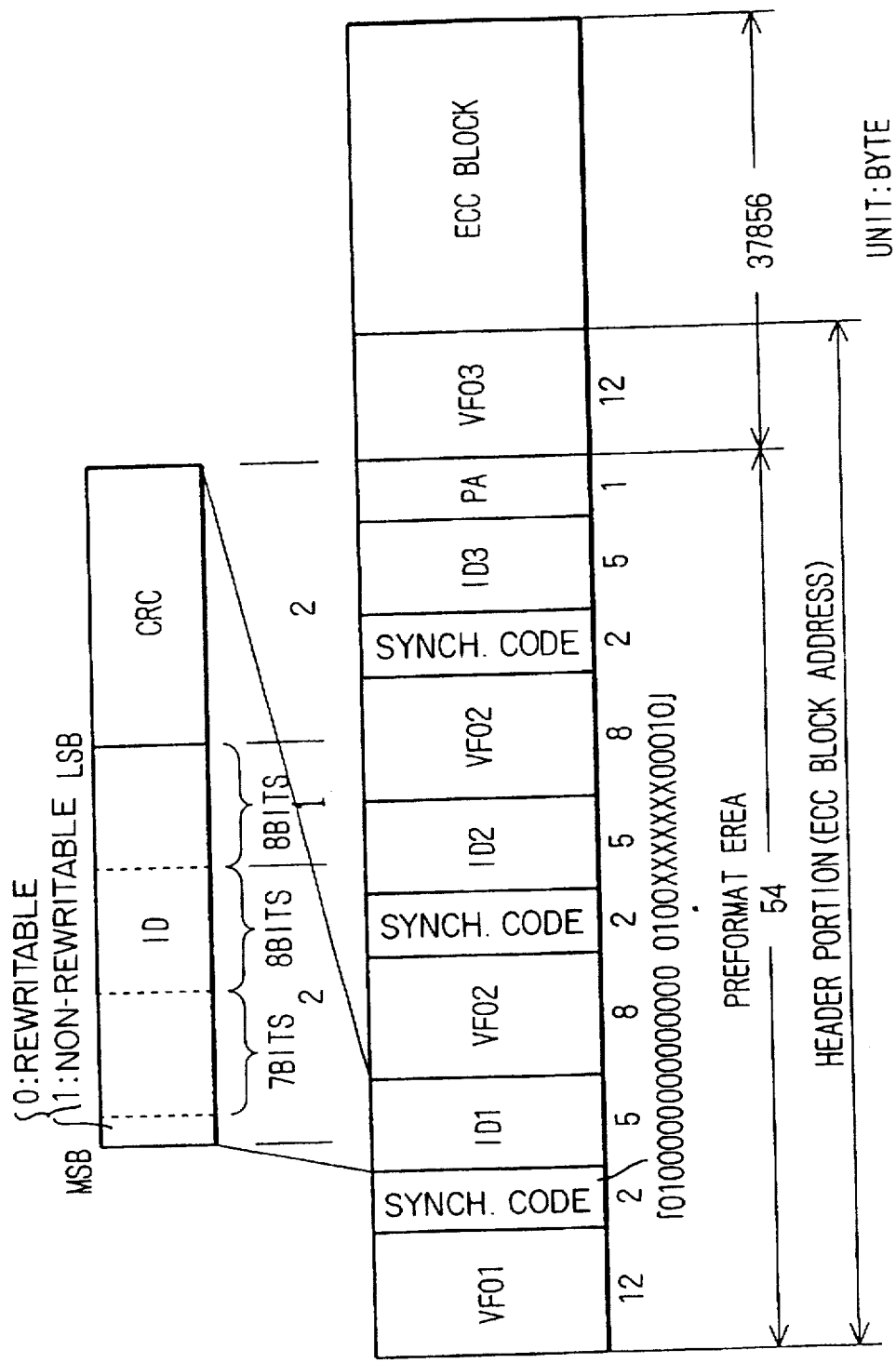
FIG. 9 is a view showing the format of ECC block address data (header portion)

ECC block address data (e.g., 66 bytes) is added to each ECC block data. As shown in FIG. 9, each ECC block address data is constituted by the following areas: a 12-byte synch. code portion VFO1, two 8-byte synch. code portions VFO2, a 12-byte synch. code portion VFO3, three 2-byte synch. codes for ID detection, three 5-byte address portion IDs, and a 1-byte postamble PA.

A consecutive data pattern (synch. code) for PLL locking is recorded in the synch. code portion VFO. A synch. code for ID detection is "0100000000000000 0100xxxxxxx00010", which is obtained by converting "119, 125, 128, 132, 138, 144, 152, 158, 164, 167, 171" into an 8–16 code. This synch. code for ID detection is different from a synch. code in ECC block data. In each address ID area, an ID such as an ECC block number consisting of 23 bits is recorded, together with the most significant bit (MSB) as a flag representing whether the corresponding ECC block can be rewritten, and a 2-byte error correcting code (CRC: Cyclic Redundancy Check). When the ECC block can be rewritten, "0" is recorded in the most significant bit (MSB). Otherwise, "1" is recorded in the most significant bit (MSB). The postamble PA is used when the error correcting code for the address portion ID exceeds 2 bytes.

As shown in FIG. 10, disk ID data as ECC block data is recorded in the innermost groove of the rewritable optical disk (RAM) 53, and recording of data on the land corresponding to this innermost ECC block data is inhibited. Subsequently, as shown in FIG. 11, the preformat data (e.g., 54 bytes) of a header portion is formed on the boundary between a groove and a land (adjacent to each other in the radial direction of the optical disk 1) for each ECC block data record area (e.g., 38,688+12 bytes). On the remaining portions, record data as record marks are recorded in the grooves and on the lands, as shown in FIGS. 12A and 12B.

The header portion is formed in forming grooves. As shown in FIG. 11, the header portion is constituted by a plurality of pits 101. The preformat pits 101 are formed with respect to grooves 102 in advance. The centers of the pits 101 are located on the same line of the tangent of the groove 102 to an adjacent land 103, as shown in FIG. 11.

As shown in FIG. 9, a pit string ID1 is the header portion of a groove 1, a pit string ID2 is the header portion of a land 1, a pit string ID3 is the header portion of a groove 2, a pit string ID4 is the header portion of a land 2, a pit string ID5 is the header portion of a groove 3, and a pit string ID6 is the header portion of a land 3.

This disk ID data includes data used to determine whether the disk is designed to record data in only grooves or both in grooves and on lands, data used to determine whether addresses on/from which data are to be recorded/reproduced are present on lands or in grooves, and the like.

The header portion corresponds to the above ECC block address data (see FIG. 9). However, a synch. code is recorded in the 12-byte synch. code portion VFO3 before recording of ECC block data, and PLL correction is performed by using the recorded synch. code in the reproduction mode.

The rewritable optical disk (RAM) 52 is designed to record disk ID data as ECC block data in the innermost groove. Subsequently, as shown in FIG. 11, the preformat data (e.g., 54 bytes) of a header portion is formed in a groove for each ECC block data record area (e.g., 38,688+12 bytes).

This disk ID data includes data used to determine whether the disk is designed to record data in only grooves or both in grooves and on lands, data used to determine whether addresses on/from which data are to be recorded/reproduced are present on lands or in grooves, and the like.

The header portion corresponds to the above ECC block address data (see FIG. 9). However, a synch. code is recorded in the 12-byte synch. code portion VFO3 before recording of ECC block data, and PLL correction is performed by using the recorded synch. code in the reproduction mode.

Figure 13:
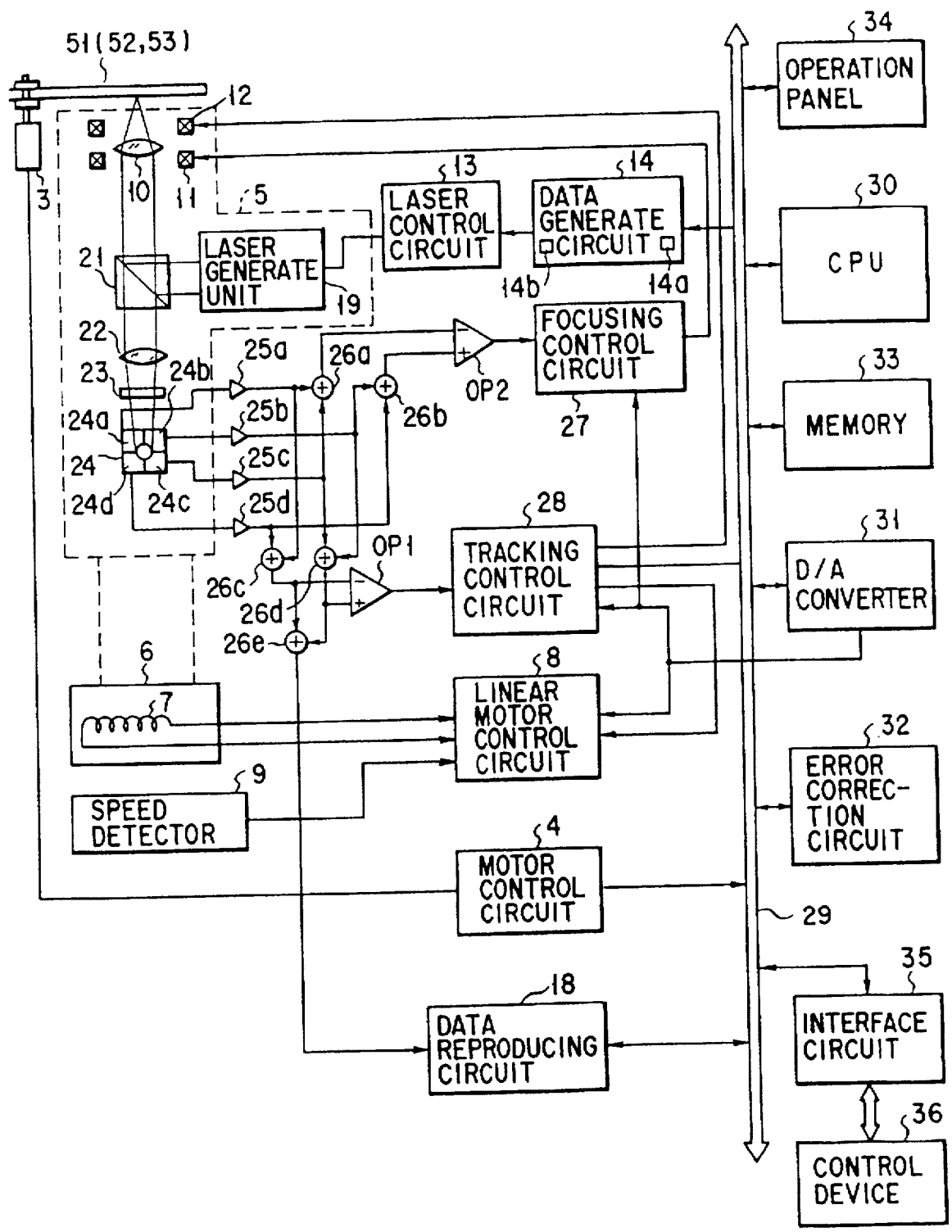
FIG. 13 is a block diagram showing the schematic arrangement of an optical disk apparatus.

An optical disk apparatus for reproducing data from the read only optical disk (CD-ROM) 51, recording data on the rewritable optical disks 52 and 53, or reproducing recorded data from the optical disks 52 and 53 will be described next with reference to FIG. 13. Since the arrangement of this apparatus is almost the same as that of the cutting apparatus, the same reference numerals denotes the same parts, and a description thereof will be omitted.

The sum signal of outputs from photodetection cells 24a to 24d of a photodetector 24, i.e., an output signal from an adder 26e, in a state wherein focusing and tracking are performed, reflects changes in the reflectance of pits (record data) formed in grooves and lands of tracks. This signal is supplied to a data reproducing circuit 18. This data reproducing circuit 18 outputs an access permission signal with respect to an ECC block with a target ID for recording, or outputs reproduced data with respect to an ECC block with a target ID for reproduction.

The data reproduced by the data reproducing circuit 18 is subjected to error correction using error correcting codes (ECCs) added by an error correction circuit 32. The resultant data is output to an optical disk control device 36 as an external device via an interface circuit 35.

A CPU 30 outputs a track ON/OFF signal, a tracking polarity switching signal, and a jump pulse to a tracking control circuit 28, thereby to move a laser beam from a tracked land to the groove or from the groove to an adjacent land.

As shown in FIG. 14, the data reproducing circuit 18 comprises a comparator circuit 61, a header synch. code detection circuit 62, a header reading circuit 63, an ECC block synch. code detection circuit 64, and a data reading circuit 65.

The comparator circuit 61 compares a reference signal with the sum signal of the outputs from the photodetection cells 24a to 24d of the photodetector 24, i.e., the changes in the reflectance of the pits (record data) formed in the grooves and lands of the tracks, thereby performing binarization. The comparator circuit 61 is constituted by a comparator and the like. The binary signal obtained by the comparator circuit 61 is supplied to the header synch. code detection circuit 62, the header reading circuit 63, the ECC block synch. code detection circuit 64, and the data reading circuit 65.

The header synch. code detection circuit 62 detects the ID detection synch. codes "0100000000000000 0100xxxxxxx00010" of the header on the basis of the binary signal (binary data) corresponding to a predetermined number of bits, which is supplied from the comparator circuit 61. The header synch. code detection circuit 62 is constituted by a shift register for storing the binary data, a register for storing the ID detection synch. codes of the header, and a comparator for comparing the data in these registers. The detection signal from the header synch. code detection circuit 62 is supplied to the header reading circuit 63.

The header reading circuit 63 reads the address portion ID of the binary data from the comparator circuit 61 in accordance with the detection signal from the header synch. code detection circuit 62. If this address portion ID coincides with the ID (to be accessed) supplied from the optical disk control device 36 as an external device, the header reading circuit 63 outputs an access permission signal. The header reading circuit 63 is constituted by a register for storing the binary data as the address portion ID from the comparator circuit 61, a register for storing the ID (to be accessed) supplied from the external device, and a comparator for comparing the data in these registers. The access permission signal from the header reading circuit 63 is supplied to the ECC block synch. code detection circuit 64, the data reading circuit 65, and the data generate circuit 14.

Upon reception of the access permission signal from the header reading circuit 63, the ECC block synch. code detection circuit 64 detects the ECC block synch. codes "0100000000000000 0100xxxxxxx00010" of the binary data, supplied from the comparator circuit 61, by the number corresponding to the number of bytes of the ECC block. The ECC block synch. code detection circuit 64 is constituted by a shift register for storing the binary data, a register for storing the ECC block synch. codes, and a comparator for comparing the data in these registers. The detection signal from the ECC block synch. code detection circuit 64 is supplied to the data reading circuit 65.

Upon reception of the access permission signal from the header reading circuit 63, the data reading circuit 65 reads 91-byte binary data as reproduced data which is supplied from the comparator circuit 61 afterward, each time the data reading circuit 65 receives a detection signal from the ECC block synch. code detection circuit 64. The data reading circuit 65 is constituted by, e.g., a demodulation circuit, a binarization circuit, and the like. The demodulation circuit demodulates the binary data supplied from the comparator circuit 61 by inverse transformation of the 8–15 code. The binarization circuit binarizes the demodulated data in units of bytes. The resultant reproduced data is supplied to the error correction circuit 32.

A laser control circuit 13 changes the intensity of a laser beam in accordance with a target optical disk.

The data generate circuit 14 outputs record data to the laser control circuit 13 in the data recording mode in accordance with an access permission signal from the header reading circuit 63.

As shown in FIG. 15, the tracking control circuit 28 comprises change-over switches 71 and 72, a polarity inverting circuit 73, a phase compensation circuit 74, an adder portion 75, and a drive circuit 76.

The change-over switch 71 is operated in accordance with a track ON/OFF signal (ON/OFF control of a tracking servo loop) from the CPU 30, like the one shown in FIG. 16D. When the track ON/OFF signal is ON, the change-over switch 71 outputs a track error signal, like the one shown in FIG. 16A, from a differential amplifier OP1 to the change-over switch 72 and the polarity inverting circuit 73.

The change-over switch 72 is operated in accordance with a tracking switching signal (land/groove switching signal) from the CPU 30, as shown in FIG. 16C. When the polarity of the tracking switching signal indicates a groove, the change-over switch 72 outputs a track error signal to the phase compensation circuit 74. When the polarity of the tracking switching signal indicates a land, the change-over switch 72 outputs a track error signal whose polarity is inverted by the polarity inverting circuit 73 to the phase compensation circuit 74.

The polarity inverting circuit 73 inverts the polarity of the track error signal supplied from the differential amplifier OP1 via the change-over switch 71. The output from the polarity inverting circuit 73 is supplied to the change-over switch 72.

The phase compensation circuit 74 compensates the phase of the track error signal having positive polarity (positive phase) or opposite or negative polarity (opposite phase), which is supplied from the change-over switch 72, and outputs the resultant signal to the adder portion 75.

The adder portion 75 adds the positive-polarity (positive-phase) track error signal or opposite-polarity (opposite-phase) track error signal which is supplied from the phase compensation circuit 74 upon compensation of the phase, with a jump pulse from the CPU 30, like the one shown in FIG. 16B. The addition result is output as a track drive signal to the drive circuit 76.

The drive circuit 76 drives a drive coil 12 in accordance with the track drive signal from the adder portion 75 to move an objective lens 10 in the tracking direction. That is, the tracking position of the laser beam is moved from a land to an adjacent groove in accordance with the jump pulse, like the one shown in FIG. 16B.

In this arrangement, the operation in which a laser beam tracking a land moves to an outer (adjacent) groove to track the groove will be described with reference to the waveforms of signals shown in FIGS. 16A, 16B, 16C, and 16D.

First of all, when the laser beam tracks a land, the change-over switch 72 is switched to the polarity inverting circuit 73 side in accordance with a tracking polarity switching signal from the CPU 30. With this operation, the polarity of a track error signal is inverted by the polarity inverting circuit 73 via the change-over switch 71, and its phase is compensated by the phase compensation circuit 74 via the change-over switch 72. The resultant signal is supplied to the drive circuit 76. In accordance with the track drive signal, the drive circuit 76 drives the drive coil 12 to cause the laser beam passing through the objective lens 10 to track a land.

In moving the laser beam, the change-over switch 71 is turned off in accordance with the OFF state of a track ON/OFF signal from the CPU 30. The tracking servo loop is released. At this time, a jump pulse from the CPU 30 is supplied to the drive circuit 76 via the adder portion 75. Upon reception of the jump pulse, the drive circuit 76 drives the drive coil 12 to move the irradiation position of the laser beam passing through the objective lens 10 from the current land to the outer (adjacent) groove. Upon completion of this movement, the change-over switch 71 is turned on again in accordance with the ON state of the track ON/OFF signal from the CPU 30. The tracking servo loop is formed.

With this operation, the laser beam passing through the objective lens 10 is caused to track the groove.

More specifically, the change-over switch 72 is switched to the change-over switch 71 side in accordance with the tracking polarity switching signal from the CPU 30. The phase of the track error signal is compensated by the phase compensation circuit 74 via the change-over switches 71 and 72. The resultant signal is used as a track drive signal and supplied to the drive circuit 76. In accordance with the track drive signal, the drive circuit 76 drives the drive coil 12 to cause the laser beam passing through the objective lens 10 to track the groove.

Note that, at this time, the waveform of the jump pulse may be inverted to cause the laser beam to move to an inner (adjacent) groove.

In addition, the same operation is performed when the laser beam tracking the groove is moved to an outer (adjacent) land to track it. Note that the waveform of the jump pulse in this case is opposite to that in the above case.

Processing to be performed in the above arrangement when one of the optical disks 51, 52, and 53 is loaded will be described next with reference to the flow chart in FIG. 17.

When the optical disk 51 (52, 53) is loaded by a loading mechanism (not shown), the CPU 30 causes the motor control circuit 4 to drive/control the motor 3 so as to rotate the optical disk at a predetermined rotational speed.

The optical head 5 is then moved to a position as an initial position opposing the innermost peripheral portion of the optical disk 51 (52, 53), and focus lock-in is performed. More specifically, the CPU 30 outputs a reproduction control signal to the laser control circuit 13. As a result, the laser control circuit 13 irradiates a reproduction laser beam from the laser generate unit 19 in the optical head 5 onto the optical disk via the objective lens 10. The laser beam reflected by the optical disk 51 (52, 53) is guided to the photodetector 24 via the objective lens 10, the half prism 21, the condenser lens 22, and the cylindrical lens 23. The differential amplifier OP2 then obtains a focusing signal on the basis of the difference between the sum signal of outputs from the photodetection cells 24a and 24c of the photodetector 24 and the sum signal of outputs from the photodetection cells 24b and 24d of the photodetector 24, and outputs it to the focusing control circuit 27. With this operation, the focusing control circuit 27 excites a drive coil 11 in accordance with the supplied focusing signal to move the objective lens 10, thereby focusing the laser beam irradiated onto the optical disk 51 (52, 53).

While this focus lock-in is performed, the differential amplifier OP1 outputs the difference between the sum signal of the outputs from the photodetection cells 24a and 24d of the photodetector 24 and the sum signal of the outputs from the photodetection cells of the photodetector 24, as a track error signal, to the tracking control circuit 28. In this case, since a tracking polarity switching signal corresponding to a groove has been supplied from the CPU 30 to the tracking control circuit 28, the track error signal from the differential amplifier OP1 is output to the phase compensation circuit 74 via the change-over switches 71 and 72. The phase compensation circuit 74 performs phase compensation of the supplied track error signal, and outputs the resultant signal as a drive signal to the drive circuit 76 via the adder portion 75.

The drive circuit 76 drives the objective lens 10 through the drive coil 12 in accordance with the supplied drive signal to perform tracking correction for fine movement of the laser beam irradiated on the optical disk 51 (52, 53) via the objective lens 10.

The optical head 5 therefore irradiates the laser beam onto the innermost peripheral portion of the optical disk 51 (52, 53).

In this state, a read signal corresponding to the data on the innermost track is binarized by the comparator circuit 61 in the data reproducing circuit 18, and the binary data is supplied to the header synch. code detection circuit 62, the header reading circuit 63, the ECC block synch. code detection circuit 64, and the data reading circuit 65.

When a header synch. code is detected by the header synch. code detection circuit 62, the header reading circuit 63 reads an address portion ID. If this address portion ID coincides with the address ID of disk ID data (to be accessed) supplied from the optical disk control device 36 as an external device, an access permission signal is output to the ECC block synch. code detection circuit 64 and the data reading circuit 65.

Every time an ECC block synch. code is detected by the ECC block synch. code detection circuit 64, the data reading circuit 65 reads subsequent 91-byte data as reproduced data. The reproduced data is demodulated by inverse transformation of an 8–15 code using a demodulation circuit (not shown), and output to the error correction circuit 32.

In handling the optical disk 51, every time an ECC block synch. code is detected by the ECC block synch. code detection circuit 64, the data reading circuit 65 may read subsequent 91-byte data as reproduced data without using the header synch. code detection circuit 62 and the header reading circuit 63. In this case, no ECC block address is required.

The error correction circuit 32 performs error correction by using error correcting codes (ECCs) added to the supplied reproduced data, and outputs the resultant data to the optical disk control device 36 as an external device via the interface circuit 35.

As a result, disk ID data is supplied to the optical disk control device 36.

The optical disk control device 36 discriminates, on the basis of the supplied disk ID data, whether the loaded optical disk is the read only optical disk 51, the rewritable optical disk (RAM) 52 designed to record data in only grooves, or the rewritable optical disk (RAM) 53 designed to record data in grooves and on lands. Upon discriminating that the optical disk is the optical disk 53, the optical disk control device 36 discriminates whether the access position is at a groove or land, and outputs these discrimination results and the address ID, at which recording or reproduction (access) is to be performed, to the CPU 30.

The CPU 30 changes the tracking switching signal to be output to the tracking control circuit 28 into a signal corresponding to a land only when receiving the discrimination result indicating that the access position is at a land. With this operation, the change-over switch 72 is switched, and the track error signal from the differential amplifier OP1 is inverted by the polarity inverting circuit 73 via the change-over switch 71 and output to the phase compensation circuit 74. As a result, the tracking control circuit 28 performs tracking correction for fine movement of the laser beam in accordance with the polarity (opposite phase) corresponding to a land.

While the above tracking operation is performed, a data recording/reproducing operation is performed.

As described above, when a command indicating movement from a land to the groove is output while a beam condensed by the objective lens is tracking the land, or a command indicating movement from the groove to a land while a beam in tracking the groove, the polarity is inverted, and a jump pulse is generated. During generation of the jump pulse, the tracking servo control is stopped to change the tracking position from the groove to a land or from a land to the groove.

With this operation, in an optical disk in which a spiral land is formed adjacent to a spiral groove, the tracking position can be accurately changed from the groove or land to the land or groove.

In the first embodiment, the rewritable optical disk (RAM) 53 has a structure in which the spiral land is formed adjacent to the spiral groove. Therefore, the groove and the land are prevented from being linked together.

The second embodiment will exemplify a rewritable optical disk (RAM) 54 having a structure in which lands and grooves are alternately formed in units of rounds and linked together. The same reference numerals in the second embodiment denote the same parts as in the first embodiment, and a detailed description thereof will be omitted.

Figure 18:
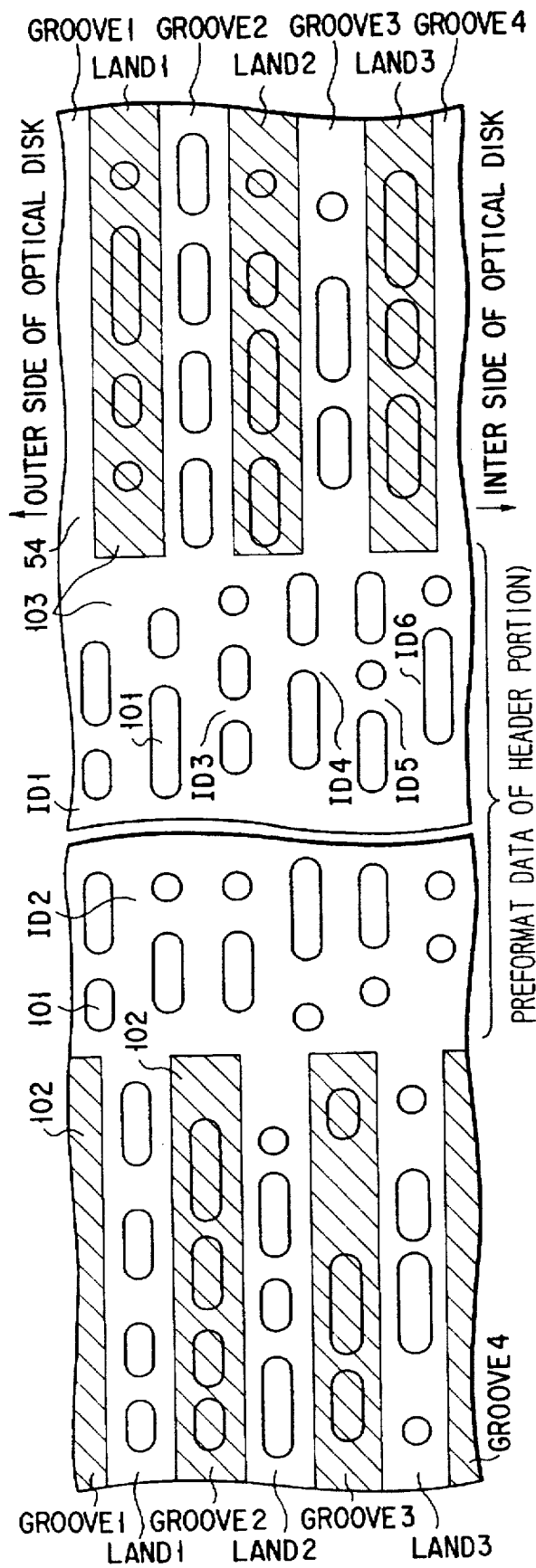
FIG. 18 is a view for explaining a header portion at a switching position and its adjacent portions.
Figure 19:
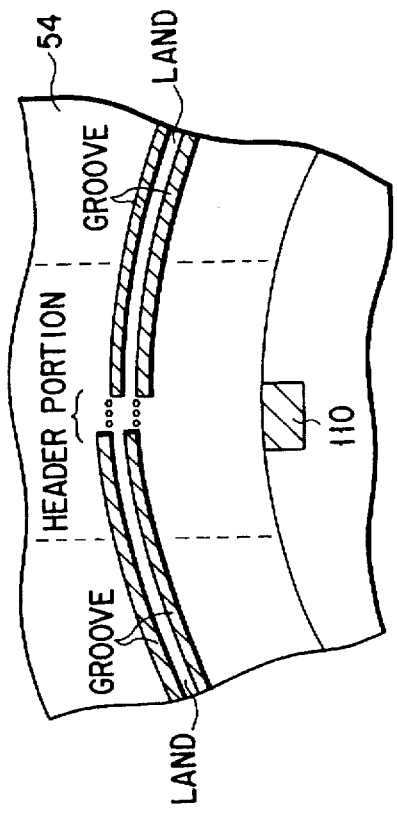
FIG. 19 is a view for explaining a mark indicating a position to switch a land or groove to a groove or land.

In this case, the optical disk 54 is formed near a header portion at a switching position for each round, as shown in FIGS. 18 and 19. Before and after the header portion, a land or groove is switched to a groove or land. At a header portion other than this switching portion, a land is formed continuously to a land before and after the header portion, while a groove is formed continuously to a groove, as shown in FIG. 11.

As shown in FIG. 19, a mark 110 indicating switching position from a land or groove to a groove to land is formed inside the innermost peripheral portion of the optical disk 54. As shown in FIG. 20, after the optical disk 54 is rotated at a constant speed, the mark 110 is detected by a photosensor 111 arranged opposing the innermost peripheral portion of the optical disk 54 to store the position of the optical disk 54 in the circumferential direction. A detected output from the photosensor 111 is converted into a digital signal by an A/D converter 112 and supplied to a CPU 30 via a bus 29.

For example, a clock from a clock generator (not shown) is counted for each round of the optical disk 54. A detected signal is supplied from the photosensor 111. The CPU 30 stores a count value at the start of detecting the mark 110 and a count value at the end of detecting the mark 110 in a memory 33.

When a laser beam reaches the start position of the mark 110, the CPU 30 outputs a track OFF signal and a tracking polarity switching signal to a tracking control circuit 28. When the laser beam passes the end position of the mark 110, the CPU 30 outputs a track ON signal to the tracking control circuit 28.

With this operation, when the laser beam reaches the start position of the mark 110 during tracking a land or groove, the tacking is stopped, and the polarity is switched. When the leaser beam passes the end position of the mark 110, the tracking is started.

An operation in this arrangement when tracking of a laser beam is switched from a land to a groove in correspondence with the switching position of the mark 110 will be described with reference to the tracking control circuit 28 shown in FIG. 15 and the waveforms of signals shown in FIGS. 16A, 16C, and 16D.

First of all, when a laser beam tracks a land, a change-over switch 72 is switched to a polarity inverting circuit 73 side in accordance with a tracking polarity switching signal from the CPU 30. With this operation, the polarity of a track error signal is inverted by the polarity inverting circuit 73 via a change-over switch 71, and its phase is compensated by a phase compensation circuit 74 via the change-over switch 72. The resultant signal is supplied to a drive circuit 76. In accordance with the track drive signal, the drive circuit 76 drives a drive coil 12 to cause the laser beam passing through the objective lens 10 to track a land.

When the laser beam reaches the start position of the mark 110, the CPU 30 outputs a track ON/OFF signal to turn off the change-over switch 71, thereby releasing a tracking servo loop. The CPU 30 outputs a tracking polarity switching signal to switch the change-over switch 72 to the change-over switch 71 side. After the laser beam passes the end position of the mark 110, the track ON/OFF signal from the CPU 30 is set ON again to turn on the change-over switch 71, thereby forming the tracking servo loop.

With this operation, the laser beam passing through the objective lens 10 is caused to track a groove.

More specifically, the change-over switch 72 is switched to the change-over switch 71 side in accordance with the tracking polarity switching signal from the CPU 30. The phase of the track error signal is compensated by the phase compensation circuit 74 via the change-over switches 71 and 72. The resultant signal is used as a track drive signal and supplied to the drive circuit 76. In accordance with the track drive signal, the drive circuit 76 drives the drive coil 12 to cause the laser beam passing through the objective lens 10 to track the groove.

The same operation is performed when the laser beam tracking a groove is caused to track a land in correspondence with the switching position of the mark 110.

Processing to be performed in the above arrangement when the optical disk 54 is loaded will be described next.

When the optical disk is loaded by a loading mechanism (not shown), the CPU 30 causes a motor control circuit 4 to drive/control a motor 3 so as to rotate the optical disk 54 at a predetermined rotational speed.

When the optical disk 54 is rotated at a constant speed, the CPU 30 detects the mark 110 in accordance with the detection signal from the photosensor 111, and stores, in the memory 33, a count value corresponding to the position of the optical disk 54 in the circumferential direction, i.e., count values corresponding to the start and end positions of the mark 110.

An optical head 5 is then moved to a position as an initial position opposing the innermost peripheral portion of the optical disk 54, and focus lock-in is performed. More specifically, the CPU 30 outputs a reproduction control signal to a laser control circuit 13. As a result, the laser control circuit 13 irradiates a reproduction laser beam from a laser generate unit 19 in the optical head 5 onto the optical disk 54 via the objective lens 10. The laser beam reflected by the optical disk 54 is guided to a photodetector 24 via the objective lens 10, a half prism 21, a condenser lens 22, and a cylindrical lens 23. A differential amplifier OP2 then obtains a focusing signal on the basis of the difference between the sum signal of outputs from photodetection cells 24a and 24c of the photodetector 24 and the sum signal of outputs from photodetection cells 24b and 24d of the photodetector 24, and outputs it to a focusing control circuit 27. With this operation, the focusing control circuit 27 excites a drive coil 11 in accordance with the supplied focusing signal to move the objective lens 10, thereby focusing the laser beam irradiated onto the optical disk 54.

While this focus lock-in is performed, a differential amplifier OP1 outputs the difference between the sum signal of the outputs from the photodetection cells 24a and 24d of the photodetector 24 and the sum signal of the outputs from the photodetection cells of the photodetector 24, as a track error signal, to the tracking control circuit 28. In this case, since a tracking polarity switching signal corresponding to a groove has been supplied from the CPU 30 to the tracking control circuit 28, the track error signal from the differential amplifier OP1 is output to the phase compensation circuit 74 via the change-over switches 71 and 72. The phase compensation circuit 74 performs phase compensation of the supplied track error signal, and outputs the resultant signal as a drive signal to the drive circuit 76 via an adder portion 75.

The drive circuit 76 drives the objective lens 10 through the drive coil 12 in accordance with the supplied drive signal to perform tracking correction for fine movement of the laser beam irradiated on the optical disk 54 via the objective lens 10.

The optical head 5 therefore irradiates the laser beam onto the innermost peripheral portion of the optical disk 54.

In this state, a read signal corresponding to the data on the innermost track is binarized by a comparator circuit 61 in a data reproducing circuit 18, and the binary data is supplied to a header synch. code detection circuit 62, a header reading circuit 63, an ECC block synch. code detection circuit 64, and a data reading circuit 65.

When a header synch. code is detected by the header synch. code detection circuit 62, the header reading circuit 63 reads an address portion ID. If this address portion ID coincides with the address ID of disk ID data (to be accessed) supplied from an optical disk control device 36 as an external device, an access permission signal is output to the ECC block synch. code detection circuit 64 and the data reading circuit 65.

Every time an ECC block synch. code is detected by the ECC block synch. code detection circuit 64, the data reading circuit 65 reads subsequent 91-byte data as reproduced data. The reproduced data is demodulated by inverse transformation of an 8–16 code using a demodulation circuit (not shown), and output to an error correction circuit 32.

In handling an optical disk 54, every time an ECC block synch. code is detected by the ECC block synch. code detection circuit 64, the data reading circuit 65 may read subsequent 91-byte data as reproduced data without using the header synch. code detection circuit 62 and the header reading circuit 63. In this case, no ECC block address is required.

The error correction circuit 32 performs error correction by using error correcting codes (ECCs) added to the supplied reproduced data, and outputs the resultant data to the optical disk control device 36 as an external device via an interface circuit 35.

As a result, disk ID data is supplied to the optical disk control device 36.

The optical disk control device 36 discriminates, on the basis of the supplied disk ID data, whether the loaded optical disk is the read only optical disk 51, a rewritable optical disk (RAM) 52 designed to record data in only grooves, or a rewritable optical disk (RAM) 53 designed to record data in grooves and on lands. Upon discriminating that the optical disk is the optical disk 53, the optical disk control device 36 discriminates whether the access position is at a groove or land, and outputs these discrimination results and the address ID, at which recording or reproduction (access) is to be performed, to the CPU 30.

The CPU 30 changes the tracking switching signal to be output to the tracking control circuit 28 into a signal corresponding to a land only when receiving the discrimination result indicating that the access position is at a land. With this operation, the change-over switch 72 is switched, and the track error signal from the differential amplifier OP1 is inverted by the polarity inverting circuit 73 via the change-over switch 72 and output to the phase compensation circuit 74. As a result, the tracking control circuit 28 performs tracking correction for fine movement of the laser beam in accordance with the polarity (opposite phase) corresponding to a land.

While the above tracking operation is performed, a data recording/reproducing operation is performed.

As described above, when a switching position is detected while a beam condensed by an objective lens tracks a groove or land, the polarity is inverted, and the tracking servo control is stopped. The tracking position of the beam is changed from the groove or land to a land or groove.

In an optical disk in which lands and grooves are alternately formed in units of rounds, and the grooves and the lands are linked together, the tracking position can be accurately changed from the groove or land to the land or groove.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical disk apparatus for recording data on a concentric or spiral groove and a land as recording tracks of an optical disk, and reproducing the recorded data, comprising:

condensing means for condensing a beam on the groove or the land on the optical disk;

detecting means for detecting the beam from the optical disk;

moving means for moving the condensing means in a direction perpendicular to an optical axis;

signal generating means for generating a track error signal for a track of the optical disk based on a detection signal from the detecting means;

polarity inverting means for inverting a polarity of the track error signal generated by the signal generating means;

control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity inverting means upon reception of a command indicating land tracking, thereby causing the beam condensed by the condensing means to track the land;

generating means for generating a jump pulse upon reception of a command indicating movement of the beam from the land to the groove while the beam condensed by the condensing means is tracking the land, or from the groove to the land while the beam condensed by the condensing means is tracking the groove; and changing means for causing the control means to stop tracking while the generating means is generating the jump pulse, causing the moving means to move the condensing means, in accordance with the jump pulse, and inverting the polarity by the polarity inverting means to start tracking upon completion of movement of the beam, thereby changing a tracking position from the groove to the land, or from the land to the groove.

2. A tracking control circuit comprising:

condensing means for condensing a beam on a concentric or spiral groove or land as a recording track of an optical disk;

detecting means for detecting the beam from the optical disk;

moving means for moving the condensing means in a direction perpendicular to an optical axis;

signal generating means for generating a track error signal for the track of the optical disk based on a detection signal from the detecting means;

polarity inverting means for inverting a polarity of the track error signal generated by the signal generating means;

control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity inverting means upon reception of a command indicating land tracking, thereby causing the beam condensed by the condensing means to track the land;

generating means for generating a jump pulse upon reception of a command indicating movement of the beam from the land to the groove while the beam condensed by the condensing means is tracking the land, or from the groove to the land while the beam condensed by the condensing means is tracking the groove; and changing means for causing the control means to stop tracking while the generating means is generating the jump pulse, causing the moving means to move the condensing means, in accordance with the jump pulse, and inverting the polarity by the polarity inverting means to start tracking upon completion of movement of the beam, thereby changing a tracking position from the groove to the land, or from the land to the groove.

3. An optical disk apparatus for recording data on a concentric or spiral groove and a land as recording tracks of an optical disk, and reproducing the recorded data, comprising:

condensing means for condensing a beam on the groove or the land on the optical disk;

detecting means for detecting the beam from the optical disk;

moving means for moving the condensing means in a direction perpendicular to an optical axis;

signal generating means for generating a track error signal for a track of the optical disk based on a detection signal from the detecting means;

polarity determining means for inverting a polarity of the track error signal generated by the signal generating means;

control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity determining means upon reception of a command indicating land tracking, thereby causing the beam condensed by the condensing means to track the land;

generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting means for inhibiting tracking control of the control means while the generating means generates the jump pulse; and changing means for causing the control means to stop tracking while the generating means is generating the jump pulse, causing the moving means to move the condensing means, in accordance with the jump pulse, and inverting the polarity by the polarity inverting means to start tracking upon completion of movement of the beam, thereby changing a tracking position from the groove to the land, or from the land to the groove.

4. A tracking control circuit comprising:

condensing means for condensing a beam on a concentric or spiral groove or land as a recording track of an optical disk;

detecting means for detecting the beam from the optical disk;

moving means for moving the condensing means in a direction perpendicular to an optical axis;

signal generating means for generating a track error signal for the track of the optical disk based on a detection signal from the detecting means;

polarity determining means for inverting a polarity of the track error signal generated by the signal generating means;

control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity determining means upon reception of a command indicating land tracking, thereby causing the beam condensed by the condensing means to track the land;

generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting means for inhibiting tracking control of the control means while the generating means generates the jump pulse; and changing means for causing the control means to stop tracking while the generating means is generating the jump pulse, causing the moving means to move the condensing means, in accordance with the jump pulse, and inverting the polarity by the polarity inverting means to start tracking upon completion of movement of the beam, thereby changing a tracking position from the groove to the land, or from the land to the groove.

5. An optical disk apparatus for recording data on a concentric or spiral groove and a land as recording tracks of an optical disk, and reproducing the recorded data, comprising:

condensing means for condensing a beam on the groove or land on the optical disk;

detecting means for detecting the beam from the optical disk;

moving means for moving the condensing means in a direction perpendicular to an optical axis;

signal generating means for generating a track error signal for a track of the optical disk based on a detection signal from the detecting means;

polarity determining means for inverting a polarity of the track error signal generated by the signal generating means; first control means for moving and controlling the condensing means by the moving means in accordance with the track error signal generated by the signal generating means upon reception of a command indicating groove tracking, thereby causing the beam condensed by the condensing means to track the groove;

second control means for moving and controlling the condensing means by the moving means in accordance with the track error signal having the polarity inverted by the polarity determining means upon reception of a command indicating land tracking, thereby causing the beam condensed by the condensing means to track the land;

generating means for generating a jump pulse upon reception of a command indicating movement of the beam from the land to the groove while the beam condensed by the condensing means is tracking the land, or from the groove to the land while the beam condensed by the condensing means is tracking the groove; and inhibiting means for inhibiting tracking control of the first and the second control means while the generating means generates the jump pulse; and changing means for causing the control means to stop tracking while the generating means is generating the jump pulse, causing the moving means to move the condensing means, in accordance with the jump pulse, and inverting the polarity by the polarity inverting means to start tracking upon completion of movement of the beam, thereby changing a tracking position from the groove to the land, or from the land to the groove.

6. A tracking control circuit comprising:

condensing means for condensing a beam on a concentric or spiral groove or land as a recording track of an optical disk;

detecting means for detecting the beam from the optical disk;

moving means for moving the condensing means in a direction perpendicular to an optical axis;

signal generating means for generating a track error signal for the track of the optical disk based on a detection signal from the detecting means;

polarity determining means for inverting a polarity of the track error signal generated by the signal generating means;

first control means for moving and controlling the condensing means by the moving means in accordance with the track error signal generated by the signal generating means upon reception of a command indicating groove tracking, thereby causing the beam condensed by the condensing means to track the groove;

second control means for moving and controlling the condensing means by the moving means in accordance with the track error signal having the polarity inverted by the polarity determining means upon reception of a command indicating land tracking, thereby causing the beam condensed by the condensing means to track the land;

generating means for generating a jump pulse upon reception of a command indicating movement of the beam from the land to the groove while the beam condensed by the condensing means is tracking the land, or from the groove to the land while the beam condensed by the condensing means is tracking the groove;

inhibiting means for inhibiting tracking control of the first and the second control means while the generating means generates the jump pulse; and changing means for causing the control means to stop tracking while the generating means is generating the jump pulse, causing the moving means to move the condensing means, in accordance with the jump pulse, and inverting the polarity by the polarity inverting means to start tracking upon completion of movement of the beam, thereby changing a tracking position from the groove to the land, or from the land to the groove.

7. A method of changing a tracking position in an optical disk apparatus for recording data on a concentric or spiral groove and a land as recording tracks of an optical disk, and reproducing the recorded data, comprising:

condensing a beam on the groove or the land on the optical disk;

detecting a beam, of the beam condensed on the groove or land, from the optical disk;

generating a track error signal for a track of the optical disk based on a detection signal;

moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land;

generating a jump pulse upon reception of a command indicating movement of the beam from the land to the groove while the condensed beam is tracking the land, or from the groove to the land while the condensed beam is tracking the groove; and stopping the tracking while the jump pulse is generated, moving the condensed beam in accordance with the jump pulse, and inverting the polarity of the track error signal to start tracking upon completion of movement of the beam, thereby changing a tracking position from the groove to the land, or from the land to the groove.

8. A method of moving a tracking control circuit, comprising:

condensing a beam on a concentric or spiral groove or land as a recording track of an optical disk;

detecting a beam, of the condensed beam on the groove or the land, from the optical disk;

generating a track error signal for the track of the optical disk based on a detection signal;

moving and controlling the beam condensed on the groove or land on the optical disk in accordance with the generated track error signal upon reception of a command indicating groove tracking, thereby causing the condensed beam to track the groove, and moving and controlling the beam condensed on the groove or the land on the optical disk in accordance with the track error signal having an inverted polarity upon reception of a command indicating land tracking, thereby causing the condensed beam to track the land;

generating a jump pulse upon reception of a command indicating movement of the beam from the land to the groove while the condensed beam is tracking the land, or from the groove to the land while the condensed beam is tracking the groove; and stopping the tracking while the jump pulse is generated, moving the condensed beam in accordance with the jump pulse, and inverting the polarity of the track error signal to start tracking upon completion of movement of the beam, thereby changing a tracking position from the groove to the land, or from the land to the groove.

9. A method of changing a tracking position in an optical disk apparatus for recording data on a concentric or spiral groove and a land as recording tracks of an optical disk, and reproducing the recorded data, comprising:

condensing a beam on the groove or land on the optical disk;

detecting a beam, of the beam condensed on the groove or land, from the optical disk;

generating a track error signal for the track of the optical disk based on a detection signal;

moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land;

generating a jump pulse upon reception of a command indicating movement of the beam from the land to the groove while the condensed beam is tracking the land, or from the groove to the land while the condensed beam is tracking the groove; and inhibiting tracking control during generation of the jump pulse; and stopping the tracking while the jump pulse is generated, moving the condensed beam in accordance with the jump pulse, and inverting the polarity of the track error signal to start tracking upon completion of movement of the beam, thereby changing a tracking position from the groove to the land, or from the land to the groove.

10. A method of changing a tracking position in a tracking control circuit, comprising:

condensing a beam on a concentric or spiral groove or land as a recording track of an optical disk;

detecting a beam, of the beam condensed on the groove or land, from the optical disk;

generating a track error signal for the track of the optical disk based on a detection signal;

moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land;

generating a jump pulse upon reception of a command indicating movement of the beam from the land to the groove while the condensed beam is tracking the land, or from the groove to the land while the condensed beam is tracking the groove; and inhibiting tracking control during generation of the jump pulse; and stopping the tracking while the jump pulse is generated, moving the condensed beam in accordance with the jump pulse, and inverting the polarity of the track error signal to start tracking upon completion of movement of the beam, thereby changing a tracking position from the groove to the land, or from the land to the groove.

11. An apparatus for an optical disk for recording data on a spiral groove and a land of the optical disk in which grooves and lands are alternately formed as recording tracks in units of rounds, and reproducing the recorded data, comprising:

condensing means for condensing a beam on the groove or the land on the optical disk;

first detecting means for detecting the beam from the optical disk;

moving means for moving the condensing means in a direction perpendicular to an optical axis;

signal generating means for generating a track error signal for the track of the optical disk based on a detection signal from the first detecting means;

polarity determining means for inverting a polarity of the track error signal generated by the signal generating means;

control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity determining means upon reception of a command indicating land tracking, thereby causing the beam condensed by the condensing means to track the land;

second detecting means for detecting a tracking shift of the beam from the land to the groove while the beam condensed by the condensing means is tracking the land, or from the groove to the land while the beam condensed by the condensing means is tracking the groove; and changing means for causing the control means to stop tracking in accordance with detection by the second detecting means, inverting the polarity by the polarity determining means, and starting tracking of the beam, thereby changing the tracking from the groove to the land, or from the land to the groove.

12. A tracking control circuit, comprising:

condensing means for condensing a beam on a spiral groove or a land of an optical disk in which grooves and lands are alternately formed as recording tracks in units of rounds;

first detecting means for detecting the beam from the optical disk;

moving means for moving the condensing means in a direction perpendicular to an optical axis;

signal generating means for generating a track error signal for the track of the optical disk based on a detection signal from the first detecting means;

polarity determining means for inverting a polarity of the track error signal generated by the signal generating means;

control means for moving and controlling the condensing means by the moving means in accordance with the track error signal generated by the signal generating means upon reception of a command indicating groove tracking, thereby causing the beam condensed by the condensing means to track the groove, and for moving and controlling the condensing means by the moving means in accordance with the track error signal having the polarity inverted by the polarity determining means upon reception of a command indicating land tracking, thereby causing the beam condensed by the condensing means to track the land;

second detecting means for detecting a tracking shift of the beam from the land to the groove while the beam condensed by the condensing means is tracking the land, or from the groove to the land while the beam condensed by the condensing means is tracking the groove; and changing means for causing the control means to stop tracking in accordance with detection by the second detecting means, inverting the polarity by the polarity determining means, and then starting tracking of the beam, thereby changing the tracking from the groove to the land, or from the land to the groove.

13. A method of changing tracking in an optical disk apparatus for recording data on a spiral groove and a land of an optical disk in which grooves and lands are alternately formed as recording tracks in units of rounds, and reproducing the recorded data, comprising:

condensing a beam on the groove or the land on the optical disk;

detecting a beam, of the beam condensed on the groove or land, from the optical disk;

generating a track error signal for the track of the optical disk based on a detecting signal;

moving and controlling the beam condensed on the groove or land on the optical disk in accordance with the generated track error signal upon reception of a command indicating groove tracking, thereby causing the condensed beam to track the groove, and moving and controlling the beam condensed on the groove or land on the optical disk in accordance with the track error signal having an inverted polarity upon reception of a command indicating land tracking, thereby causing the condensed beam to track the land;

detecting a tracking shift of the beam from the land to the groove while the condensed beam is tracking the land, or from the groove to the land while the condensed beam is tracking the groove; and stopping the tracking in accordance with detecting the tracking shift of the beam, inverting the polarity of the track error signal, and then starting the tracking of the beam, thereby changing the tracking from the groove to the land, or from the land to the groove.

* * * * *